(12) United States Patent
Kim et al.

(10) Patent No.: US 12,547,273 B2
(45) Date of Patent: Feb. 10, 2026

(54) LIGHT EMITTING DISPLAY APPARATUS

(71) Applicant: LG Display Co., Ltd., Seoul (KR)

(72) Inventors: Jongsung Kim, Paju-si (KR);
NamYong Gong, Paju-si (KR);
SungChul Kim, Paju-si (KR);
HoonBae Kim, Paju-si (KR); SunYeop Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/917,972

(22) Filed: Oct. 16, 2024

(65) Prior Publication Data

US 2025/0216975 A1    Jul. 3, 2025

(30) Foreign Application Priority Data

Dec. 28, 2023   (KR) .......................... 10-2023-0194695

(51) Int. Cl.
| | | |
|---|---|---|
| *G06F 3/041* | (2006.01) | |
| *G06F 3/0354* | (2013.01) | |
| *G06F 3/044* | (2006.01) | |
| *G09G 3/32* | (2016.01) | |

(52) U.S. Cl.
CPC ...... *G06F 3/04166* (2019.05); *G06F 3/03545* (2013.01); *G06F 3/0412* (2013.01); *G06F 3/04162* (2019.05); *G06F 3/0441* (2019.05); *G09G 3/32* (2013.01); *G09G 2300/0426* (2013.01); *G09G 2300/0842* (2013.01)

(58) Field of Classification Search
CPC ...... G06F 3/041–047; G06F 2203/041–04114; G06F 3/0441; G06F 3/04162; G06F 3/04166; G06F 3/03545; G06F 3/0383; G06F 3/0412; G06F 3/0442; G06F 3/0446; H10K 59/40; G09G 3/32
See application file for complete search history.

(56) References Cited

U.S. PATENT DOCUMENTS

| | | | |
|---|---|---|---|
| 9,606,655 B2 | 3/2017 | Choo et al. | |
| 11,494,030 B2 | 11/2022 | Choo et al. | |
| 2012/0056835 A1 | 3/2012 | Choo et al. | |
| 2017/0177154 A1 | 6/2017 | Choo et al. | |
| 2021/0263601 A1* | 8/2021 | Choi | G06F 3/03545 |
| 2023/0114072 A1* | 4/2023 | Kang | G09G 3/2092 |
| | | | 345/173 |

FOREIGN PATENT DOCUMENTS

| | | |
|---|---|---|
| KR | 10-1682964 B1 | 12/2016 |
| KR | 10-1761580 B1 | 7/2017 |

* cited by examiner

*Primary Examiner* — Sanjiv D. Patel
(74) *Attorney, Agent, or Firm* — Fenwick & West LLP

(57) ABSTRACT

A light emitting display apparatus in which an area where a gate pulse is supplied is different from an area where an uplink signal is supplied is disclosed. The light emitting display apparatus comprises a light emitting device unit with light emitting devices and gate lines, a touch electrode unit including touch electrodes on the light emitting device unit, and a touch driver sensing a pen touch by driving the touch electrode unit, wherein the touch electrode unit includes a first area and a second area, each of the first area and the second area is in parallel with the gate lines, and in one-frame period, the touch driver supplies an uplink signal to a touch driving electrode in the first area or the second area during a display period in which an image is output from the light emitting device unit.

18 Claims, 18 Drawing Sheets

LIGHT EMITTING DISPLAY APPARATUS

CROSS-REFERENCE TO RELATED APPLICATION

This application claims the benefit of the Republic of Korea Patent Application No. 10-2023-0194695 filed on Dec. 28, 2023, which is hereby incorporated by reference in its entirety.

BACKGROUND

Field of Technology

The present disclosure relates to a light emitting display apparatus.

Discussion of the Related Art

Light emitting display apparatuses are mounted on or provided in electronic products such as televisions, monitors, notebook computers, smart phones, tablet computers, electronic pads, wearable devices, watch phones, portable information devices, navigation devices, or vehicle control display devices, etc., to display images. Pixels are provided in a light emitting display panel configuring a light emitting display apparatus, and an opening portion through which light is output is provided in each of the pixels.

An image output from a light emitting display apparatus to which a touch pen is applied is affected by an uplink signal transmitted from the light emitting display apparatus to the touch pen. Accordingly, the quality of the light emitting display apparatus can be deteriorated.

SUMMARY

Accordingly, the present disclosure is directed to providing a light emitting display apparatus that substantially obviates one or more problems due to limitations and disadvantages of the related art.

An embodiment of the present disclosure is directed to providing a light emitting display apparatus in which an area where a gate pulse is supplied is different from an area where an uplink signal is supplied.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description as well as the appended drawings.

To achieve these and other advantages and in accordance with the purpose of the disclosure, as embodied and broadly described herein, there is provided a light emitting display apparatus comprising a light emitting device unit with light emitting devices and gate lines, a touch electrode unit including touch electrodes provided on the light emitting device unit, and a touch driver sensing a pen touch by driving the touch electrode unit, wherein the touch electrode unit includes a first area and a second area, each of the first area and the second area is provided in parallel with the gate lines, and in a one-frame period, the touch driver supplies an uplink signal to a touch driving electrode provided in the first area or the second area during a display period in which an image is output from the light emitting device unit.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
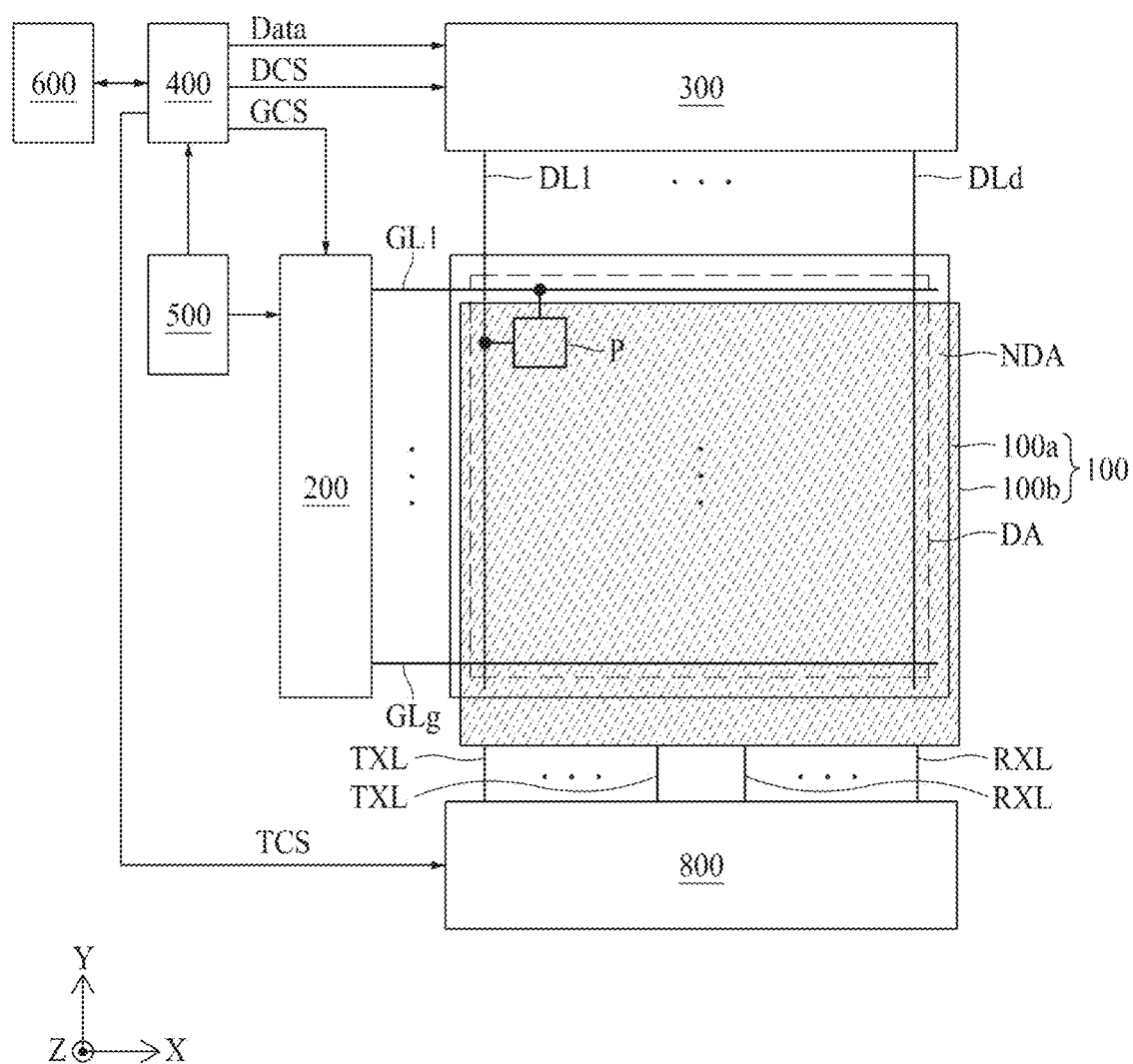
FIG. 1 is an exemplary diagram illustrating a configuration of a light emitting display apparatus according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present disclosure are used, another part can be added unless "only" is used. The terms of a singular form can include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts can be disposed between the two parts unless a more limiting term, such as "just" or "direct(ly)" is used.

In describing a time relationship, for example, when the temporal order is described as, for example, "after," "subsequent," "next," and "before," a case that is not continuous can be included unless a more limiting term, such as "just," "immediate(ly)," or "direct(ly)" is used.

It will be understood that, although the terms "first," "second," etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. can be used. These terms are intended to identify the corresponding elements from the other elements, and basis, order, or number of the corresponding elements should not be limited by these terms. The expression that an element is "connected," "coupled," or "adhered" to another element or layer the element or layer cannot only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, embodiments of the present disclosure will be described in detail with reference to the accompanying drawings.

Figure 2:
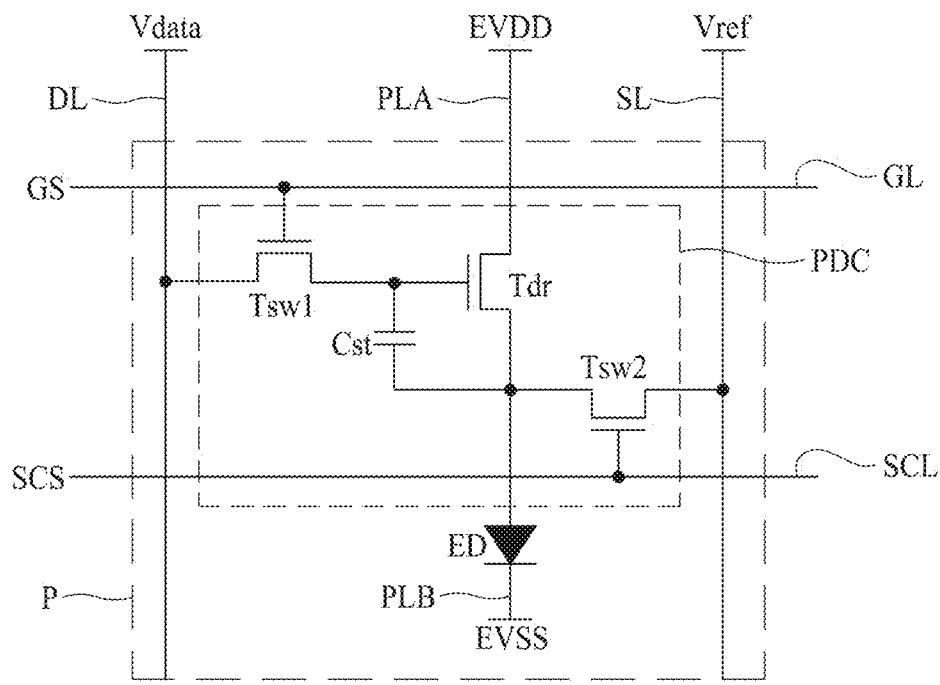
FIG. 2 is an exemplary diagram illustrating a structure of a pixel applied to a light emitting display apparatus according to an embodiment of the present disclosure.
Figure 3:
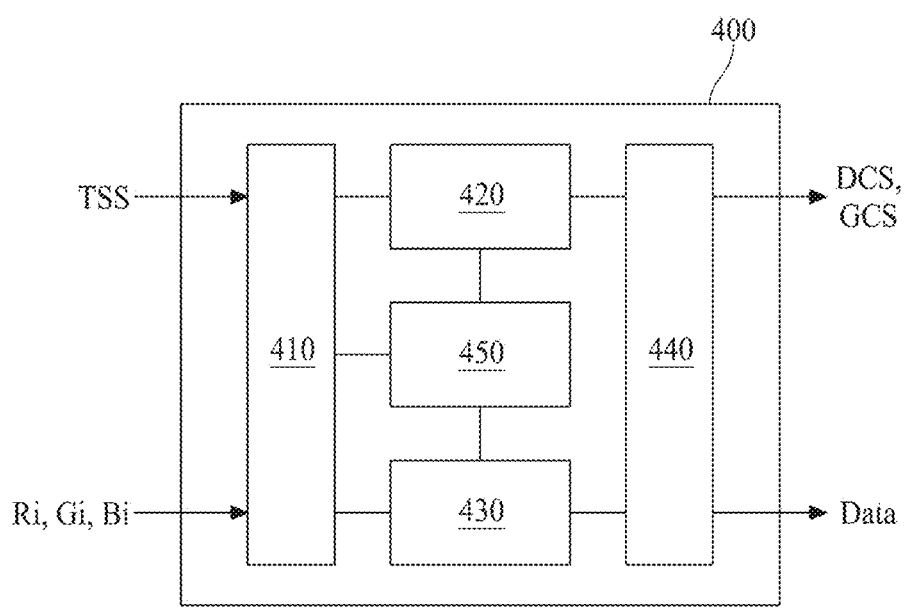
FIG. 3 is an exemplary diagram illustrating a structure of a control driver applied to a light emitting display apparatus according to an embodiment of the present disclosure.
Figure 4:
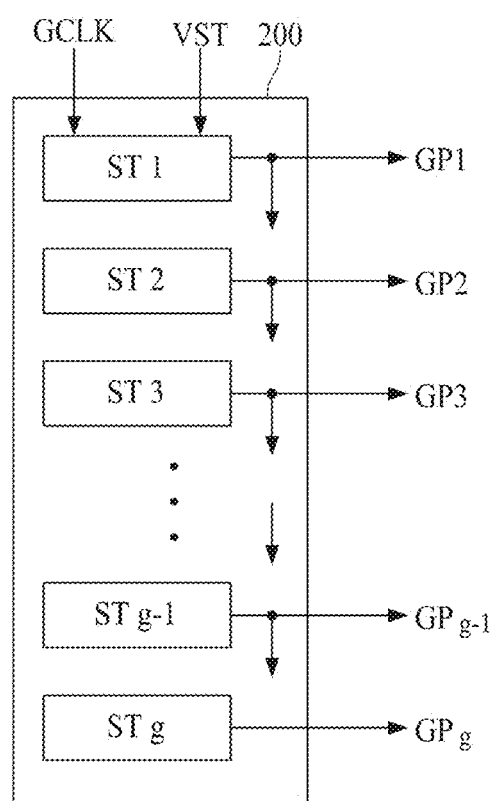
FIG. 4 is an exemplary diagram illustrating a structure of a gate driver applied to a light emitting display apparatus according to an embodiment of the present disclosure.
Figure 5:
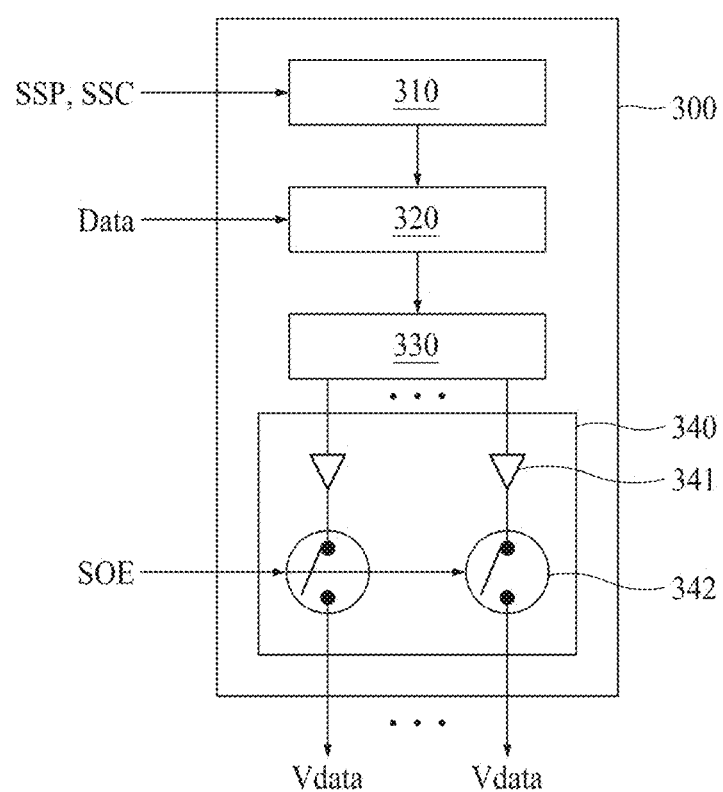
FIG. 5 is an exemplary diagram illustrating a structure of a data driver applied to a light emitting display apparatus according to an embodiment of the present disclosure.

FIG. 1 is an exemplary diagram illustrating a configuration of a light emitting display apparatus according to an embodiment of the present disclosure, FIG. 2 is an exemplary diagram illustrating a structure of a pixel applied to a light emitting display apparatus according to an embodiment of the present disclosure, FIG. 3 is an exemplary diagram illustrating a structure of a control driver applied to a light emitting display apparatus according to an embodiment of the present disclosure, FIG. 4 is an exemplary diagram illustrating a structure of a gate driver applied to a light emitting display apparatus according to an embodiment of the present disclosure, and FIG. 5 is an exemplary diagram illustrating a structure of a data driver applied to a light emitting display apparatus according to an embodiment of the present disclosure.

A light emitting display apparatus according to an embodiment of the present disclosure can be used as various kinds of electronic devices. Electronic devices can be, for example, televisions, monitors, etc.

The light emitting display apparatus according to an embodiment of the present disclosure, as illustrated in FIG. 1, can include a light emitting display panel 100 which includes a display area DA displaying an image and a non-display area NDA provided outside the display area DA, a gate driver 200 which supplies gate signals GS to a plurality of gate lines GL1 to GLg provided in the display area DA of the display panel 100, a data driver 300 which supplies data voltages Vdata to a plurality of data lines DL1 to DLd provided in the display area DA of the display panel 100, a touch driver 800 which supplies uplink signals to touch electrodes provided in the light emitting display panel 100, a control driver 400 which controls driving of the gate driver 200, the data driver 300, and the touch driver 800, and a power supply unit 500 which supplies power to the control driver 400, the gate driver 200, the data driver 300, the touch driver 800, and the light emitting display panel 100.

First, the light emitting display panel 100 can include a light emitting device unit 100*a* on which an image is displayed and a touch electrode unit 100*b* in which touch electrodes for touch sensing are provided.

The light emitting device unit 100*a* can include a display area DA and a non-display area NDA. Gate lines GL1 to GLg, data lines DL1 to DLd, and pixels P can be provided in the display area DA. Accordingly, an image can be displayed in the display area DA. Here, g and d are natural numbers. The non-display area NDA can surround the outer periphery of the display area DA.

A pixel P included in the light emitting device unit 100a, as illustrated in FIG. 2, can include a pixel driving circuit PDC which includes a switching transistor Tsw1, a storage capacitor Cst, a driving transistor Tdr, and a sensing transistor Tsw2, and a light emitting device ED connected to the pixel driving circuit PDC.

A first terminal of the driving transistor Tdr can be connected to a first voltage supply line through which a first voltage EVDD is supplied, and a second terminal of the driving transistor Tdr can be connected to the light emitting device ED.

A first terminal of the switching transistor Tsw1 can be connected to a data line DL, a second terminal of the switching transistor Tsw1 can be connected to a gate of the driving transistor Tdr, and a gate of the switching transistor Tsw1 can be connected to a gate line GL.

A data voltage Vdata can be supplied through the data line DL from the data driver 300. A gate signal GS can be supplied through the gate line GL from the gate driver 200. The gate signal GS can include a gate pulse GP for turning on the switching transistor Tsw1 and a gate-off signal for turning off the switching transistor Tsw1.

The sensing transistor Tsw2 can be provided for measuring a threshold voltage of the driving transistor Tdr or mobility of an electrical charge (for example, an electron), or supplying a reference voltage Vref to the pixel driving circuit PDC. A first terminal of the sensing transistor Tsw2 can be connected to the second terminal of the driving transistor Tdr and the light emitting device ED, a second terminal of the sensing transistor Tsw2 can be connected to a sensing line SL through which the reference voltage Vref is supplied, and a gate of the sensing transistor Tsw2 can be connected to a sensing control line SCL through which a sensing control signal SCS is supplied.

The sensing line SL can be connected to the data driver 300 and can be connected to the power supply unit 500 through the data driver 300. For example, the reference voltage Vref supplied from the power supply unit 500 can be supplied to the pixels through the sensing line SL, sensing signals transmitted from the pixels P can be converted into digital sensing signals in the data driver 300, and the digital sensing signals can be transmitted to the control driver 400.

The light emitting device ED can include a first electrode supplied with a first voltage EVDD through the driving transistor Tdr, a second electrode connected to a second voltage supply line PLB through which a second voltage is supplied, and a light emitting layer provided between the first electrode and the second electrode. The first electrode can be an anode and the second electrode can be a cathode.

The structure of the pixel P applied to a light emitting display apparatus according to an embodiment of the present disclosure is not limited to the structure illustrated in FIG. 2. Accordingly, the structure of the pixel P can be changed to various shapes.

The touch electrode unit 100b performs a function of sensing a pen touch, and for this purpose, the touch electrode unit 100b includes touch driving electrodes and touch receiving electrodes.

In this case, the touch driving electrodes can be connected to the touch driver 800 through touch driving electrode lines TXL, and the touch receiving electrodes can be connected to the touch driver 800 through touch receiving electrode lines RXL.

The control driver 400 can realign input image data Ri, Gi, and Bi transmitted from an external system 600 by using a timing synchronization signal TSS transmitted from the external system and can generate a data control signal DCS which is to be supplied to the data driver 300 and a gate control signal GCS which is to be supplied to the gate driver 200.

To this end, as illustrated in FIG. 3, the control driver 400 can include a data aligner 430 (e.g., a circuit) which realigns input image data Ri, Gi, and Bi to generate image data Data, a control signal generator 420 (e.g., a circuit) which generates the gate control signal GCS and the data control signal DCS by using the timing synchronization signal TSS, an input unit 410 (e.g., a circuit) which transmits the timing synchronization signal TSS transmitted from the external system 600 to the control signal generator 420 and transmits the input image data Ri, Gi, and Bi transmitted from the external system 600 to the data aligner 430, and an output unit 440 (e.g., a circuit) which supplies the data driver 300 with the image data Data generated by the data aligner 430 and the data control signal DCS generated by the control signal generator 420 and supplies the gate driver 200 with the gate control signal GCS generated by the control signal generator 420.

The control signal generator 420 can generate a power control signal supplied to the power supply unit 500.

The control signal generator 420 can generate a touch control signal TCS supplied to the touch driver 800.

The control driver 400 can further include a storage unit (e.g., memory) 450 for storing various information. The storage unit 450 can be included in the control driver 400 as illustrated in FIG. 3, but can be separated from the control driver 400 and provided independently.

The external system 600 can perform a function of driving the control driver 400 and an electronic device.

For example, when the electronic device is a television (TV), the external system 600 can receive various kinds of sound information, image information, and letter information over a communication network and can transmit the received image information to the control driver 400. For example, the external system 600 can convert the image information into input image data Ri, Gi, and Bi and transmit the input image data Ri, Gi, and Bi to the control driver 400.

The power supply unit 500 can generate various powers and supply the generated powers to the control driver 400, the gate driver 200, the data driver 300, the touch driver 800, and the light emitting device unit 100a.

The gate driver 200 can be directly embedded into the non-display area NDA by using a gate-in panel (GIP) type, or the gate driver 200 can be provided in the display area DA in which light emitting devices ED are provided, or the gate driver 200 can be provided on a chip on film mounted in the non-display area NDA.

The gate driver 200 can supply gate pulses GP1 to GPg to the gate lines GL1 to GLg.

When a gate pulse GP generated by the gate driver 200 is supplied to a gate of the switching transistor Tsw1 included in the pixel P, the switching transistor Tsw1 can be turned on. When the switching transistor Tsw1 is turned on, data voltage Vdata supplied through a data line DL can be supplied to the pixel P.

When a gate-off signal generated by the gate driver 200 is supplied to the switching transistor Tsw1, the switching transistor Tsw1 can be turned off. When the switching transistor Tsw1 is turned off, a data voltage cannot be supplied to the pixel P any longer.

The gate signal GS supplied to the gate line GL can include the gate pulse GP and the gate-off signal.

To supply gate pulses GP1 to GPg to gate lines GL1 to GLg, the gate driver 200, as illustrated in FIG. 4, can include stages ST1 to STg connected to gate lines GL1 to GLg.

Each of the stages ST1 to STg can be connected to one gate line GL, but can be connected to at least two gate lines GL.

In order to generate gate pulses GP1 to GPg, a gate start signal VST and at least one gate clock GCLK which are generated by the control signal generator 420 can be transferred to the gate driver 200. For example, the gate start signal VST and the at least one gate clock GCLK can be included in the gate control signal GCS.

One of the stages ST1 to STg can be driven by a gate start signal VST to output a gate pulse GP to a gate line GL. The gate pulse GP can be generated by a gate clock GCLK.

At least one of signals output from a stage ST where a gate pulse is output can be supplied to another stage ST to drive another stage ST. Accordingly, a gate pulse can be output in another stage ST.

For example, the stages ST can be driven sequentially to sequentially supply the gate pulses GP to the gate lines GL.

The data driver 300 can supply data voltages Vdata to the data lines DL1 to DLd.

To this end, the data driver 300, as illustrated in FIG. 5, can include a shift register 310 which outputs a sampling signal, a latch 320 (e.g., a circuit) which latches image data Data received from the control driver 400, a digital-to-analog converter 330 which converts the image data Data, transmitted from the latch 320, into a data voltage Vdata and outputs the data voltage Vdata, and an output buffer 340 which outputs the data voltage, transmitted from the digital-to-analog converter 330, to the data line DL on the basis of a source output enable signal SOE.

The shift register 310 can output the sampling signal by using the data control signal DCS received from the control signal generator 420. For example, the data control signals DCS transmitted to the shift register 310 can include a source start pulse SSP and a source shift clock signal SSC.

The latch 320 can latch image data Data sequentially received from the control driver 400, and then output the image data Data to the digital-to-analog converter 330 at the same time on the basis of the sampling signal.

The digital-to-analog converter 330 can convert the image data Data transmitted from the latch 320 into data voltages Vdata and output the data voltages Vdata.

The output buffer 340 can simultaneously output the data voltages Vdata transmitted from the digital-to-analog converter 330 to data lines DL1 to DLd of the light emitting display panel 100 on the basis of the source output enable signal SOE transmitted from the control signal generator 420.

To this end, the output buffer 340 can include a buffer 341 which stores the data voltage Vdata transmitted from the digital-to-analog converter 330 and a switch 342 which outputs the data voltage Vdata stored in the buffer 341 to the data line DL on the basis of the source output enable signal SOE.

For example, when the switches 342 are turned on based on the source output enable signal SOE simultaneously supplied to the switches 342, the data voltages Vdata stored in the buffers 341 can be supplied to the data lines DL1 to DLd through the switches 342.

The data voltages Vdata supplied to the data lines DL1 to DLd can be supplied to pixels P connected to a gate line GL supplied with a gate pulse GP.

Figure 6A:
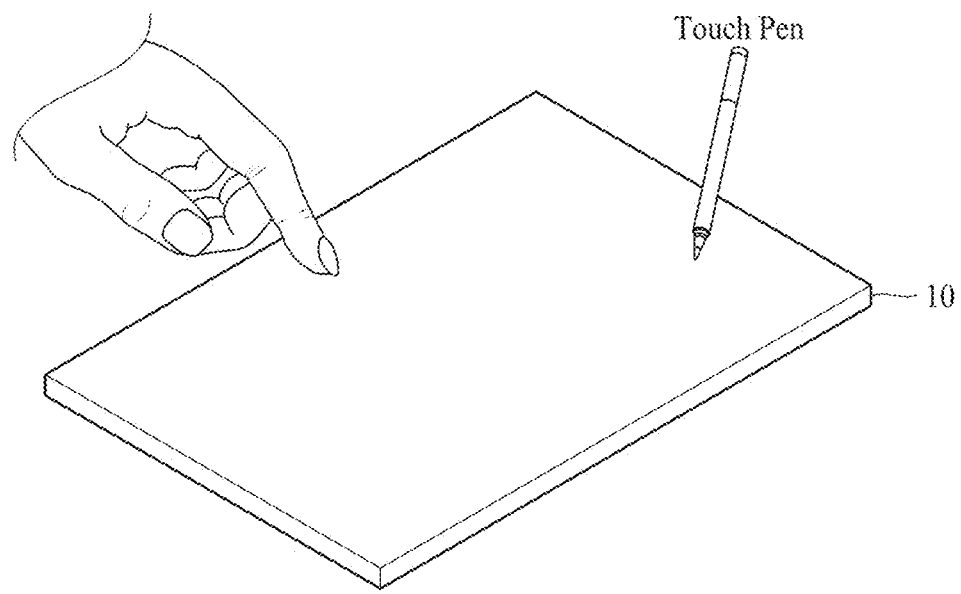
FIG. 6A is an exemplary diagram illustrating a method of using a light emitting display apparatus according to an embodiment of the present disclosure.
Figure 6B:
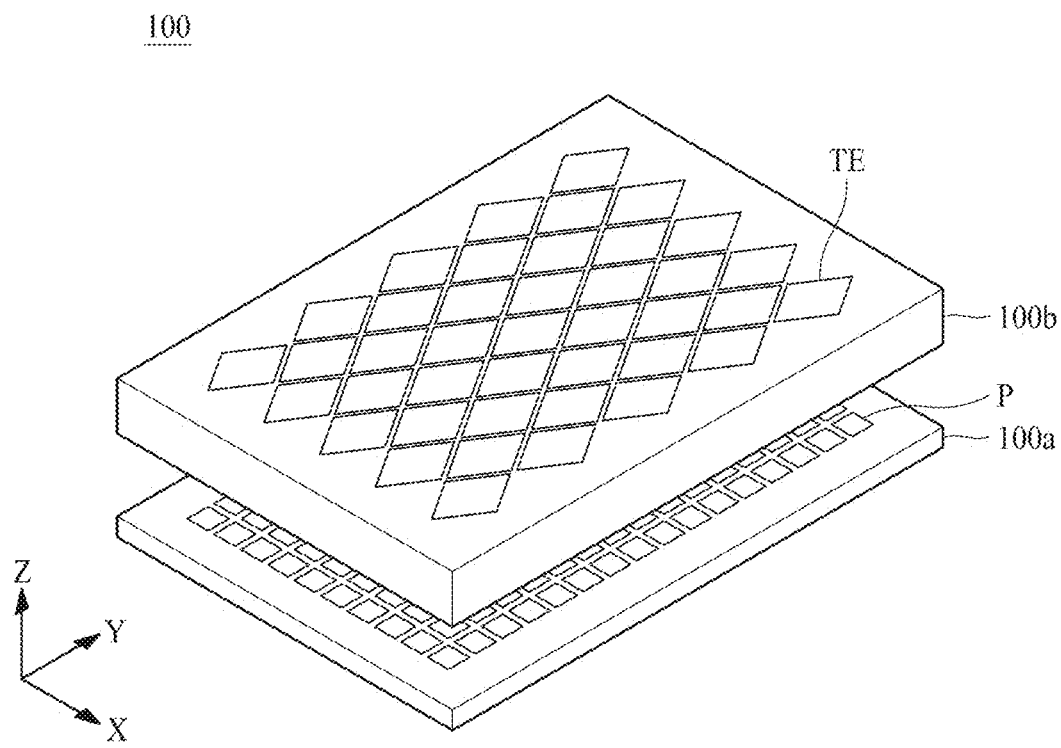
FIG. 6B is an exemplary diagram illustrating a structure of a light emitting display panel applied to a light emitting display apparatus according to an embodiment of the present disclosure.
Figure 7A:
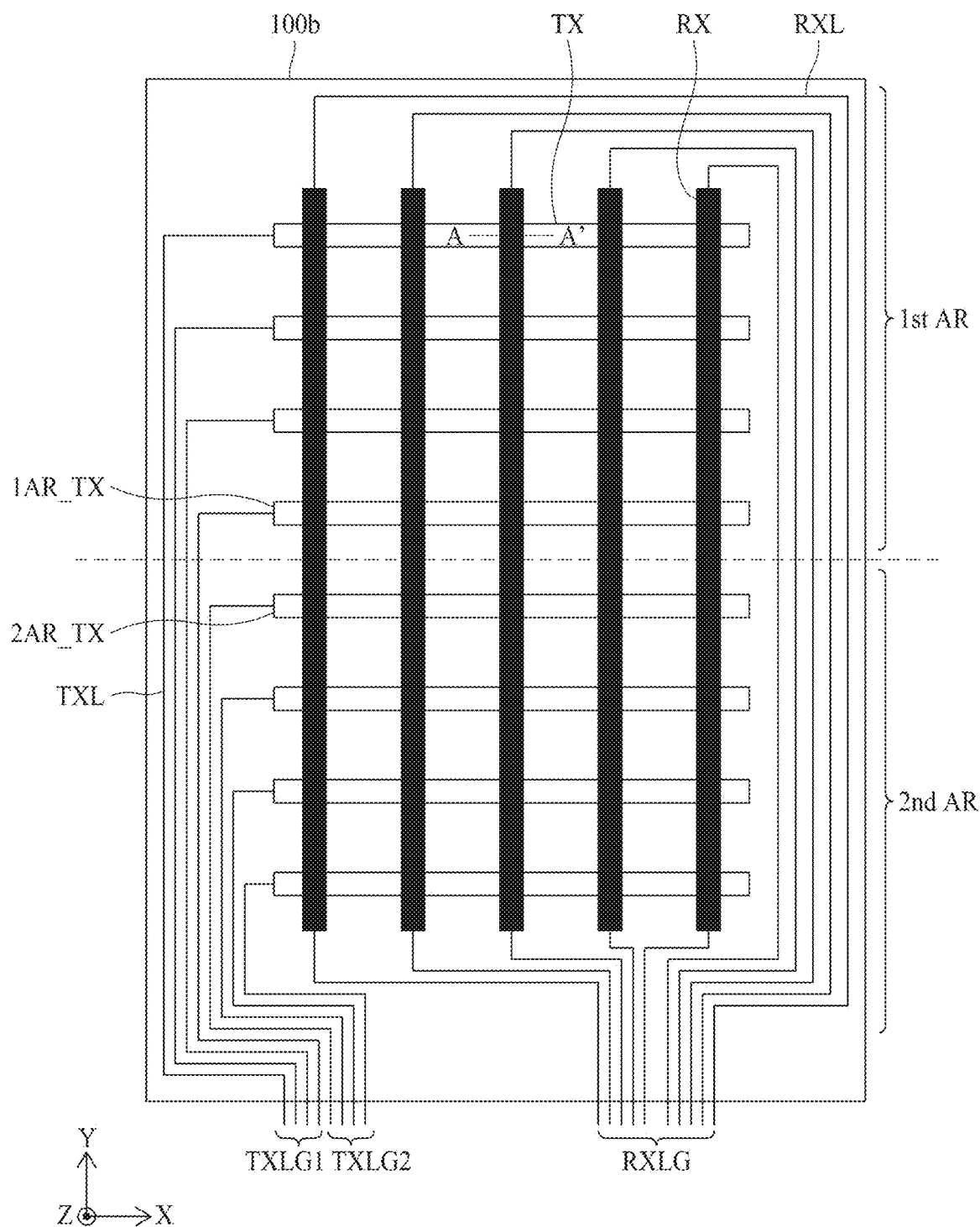
FIG. 7A is an exemplary diagram illustrating a structure of a touch electrode unit illustrated in FIG. 6B according to an embodiment of the present disclosure.
Figure 7B:
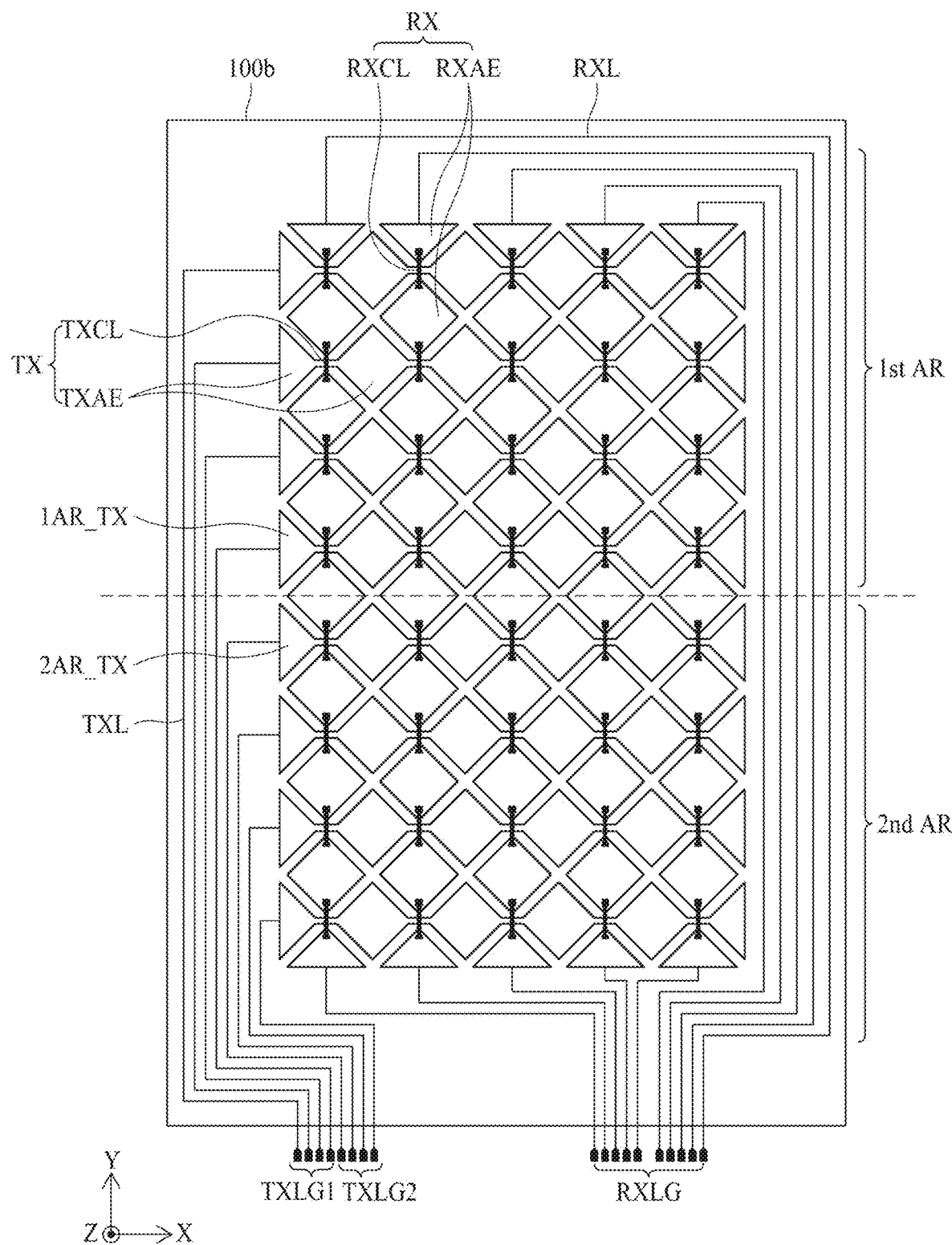
FIG. 7B is another exemplary diagram illustrating a structure of a touch electrode unit illustrated in FIG. 6B according to an embodiment of the present disclosure.
Figure 8:
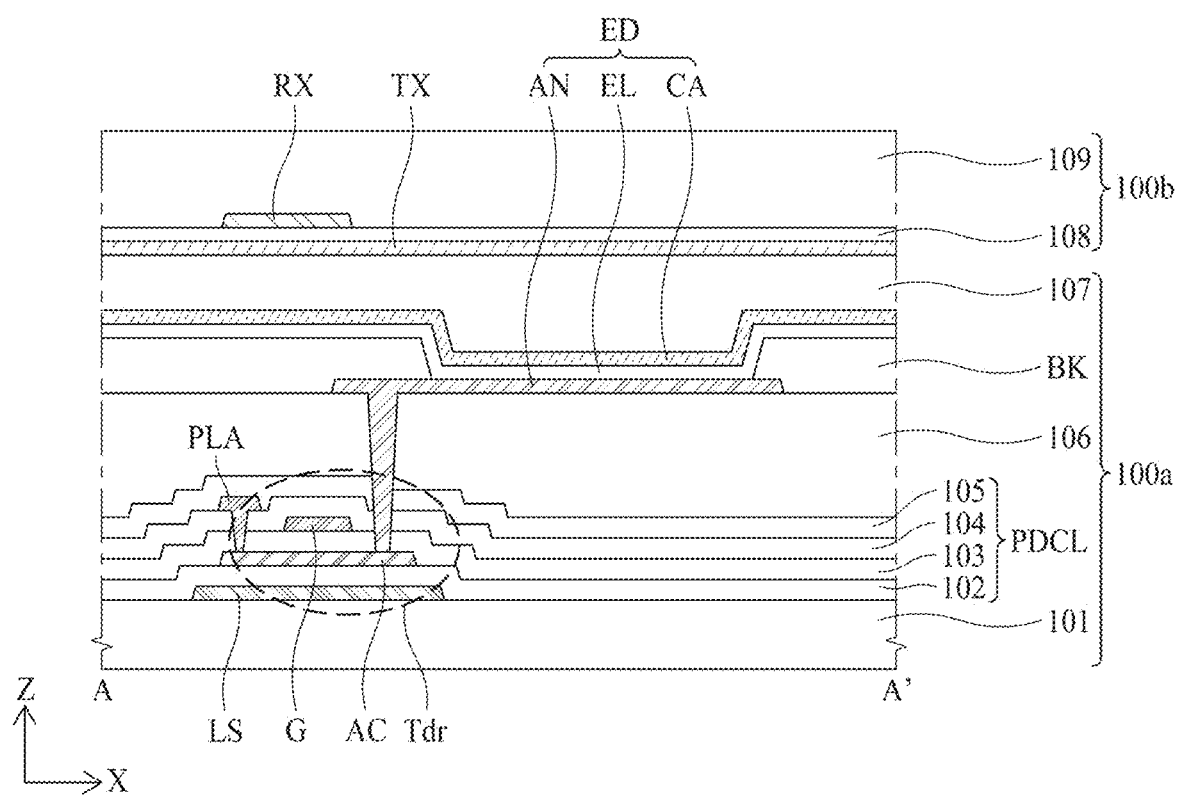
FIG. 8 is an exemplary diagram illustrating a cross-sectional surface taken along a line A-A' illustrated in FIG. 7A according to an embodiment of the present disclosure.

FIG. 6A is an exemplary diagram illustrating a method of using a light emitting display apparatus according to an embodiment of the present disclosure, FIG. 6B is an exemplary diagram illustrating a structure of a light emitting display panel applied to a light emitting display apparatus according to an embodiment of the present disclosure, FIG. 7A is an exemplary diagram illustrating a structure of a touch electrode unit illustrated in FIG. 6B according to an embodiment of the present disclosure, FIG. 7B is another exemplary diagram illustrating a structure of a touch electrode unit illustrated in FIG. 6B according to an embodiment of the present disclosure, and FIG. 8 is an exemplary diagram illustrating a cross-sectional surface taken along a line A-A' illustrated in FIG. 7A according to an embodiment of the present disclosure.

First, referring to FIG. 6A, a light emitting display apparatus 10 according to an embodiment of the present disclosure can sense a touch by a touch pen (hereinafter, simply referred to as a pen touch), and for this purpose, a touch pen can be in contact with a light emitting display apparatus 10 according to an embodiment of the present disclosure.

Also, a light emitting display apparatus 10 according to an embodiment of present disclosure can further sense a touch by a user's finger (hereinafter, simply referred to as a finger touch), and for this purpose, the user's finger can be in contact with a light emitting display apparatus 10 according to an embodiment of present disclosure.

Next, referring to FIG. 6B, as described above, a light emitting display panel 100 can include a light emitting device unit 100a on which an image is displayed and a touch electrode unit 100b in which touch electrodes TE for touch sensing are provided.

The light emitting device unit 100a can include pixels P, data lines DL1 to DLd, and gate lines GL1 to GLg. Each of the pixels P can include a light emitting device ED and a pixel driving circuit PDC. As lights are output from the light emitting devices ED, an image can be displayed on the light emitting device unit 100a.

The touch electrode unit 100b can include touch electrodes TE. The touch electrodes TE can include touch driving electrodes and touch receiving electrodes. That is, the touch electrode unit 100b can include touch driving electrodes and touch receiving electrodes.

In this case, the touch electrode unit 100b can be provided inside the light emitting device unit 100a, or can be provided on an encapsulation layer of the light emitting device unit 100a.

Next, the light emitting display panel 100 can include, for example, a light emitting device unit 100a on which an image is displayed and a touch electrode unit 100b provided at an upper end of the light emitting device unit 100a to sense a touch, as illustrated in FIGS. 7A and 8.

The light emitting device unit 100a includes pixels P, and each of the pixels P can include a light emitting device ED, a pixel driving circuit PDC, a gate line GL, and a data line DL.

For example, the light emitting device unit 100a, as illustrated in FIG. 8, can include a substrate 101, a pixel driving circuit layer PDCL provided on the substrate 101, a planarization layer 106 covering the pixel driving circuit layer PDCL, an anode AN provided on an upper end of the planarization layer 106, a bank BK covering ends of the anode AN, a light emitting layer EL covering the anode AN and the bank BK, a cathode CA covering the light emitting layer, and an encapsulation layer 107 covering the cathode CA.

The substrate 101 can be any one of a glass substrate, a plastic substrate, and a flexible substrate.

The pixel driving circuit layer PDCL can be provided on the substrate 101. The pixel driving circuit layer PDCL can include the transistors Tsw1, Tsw2, and Tsdr, and a capacitor Cst described with reference to FIG. 2.

That is, the transistors Tsw1, Tsw2, and Tdr, and a capacitor Cst described with reference to FIG. 2 can be provided on the substrate 101.

For example, the light emitting device unit 100a having only the driving transistor Tdr in the pixel driving circuit layer PDCL is illustrated in FIG. 8, but various transistors and capacitors can be further provided in the pixel driving circuit layer PDCL in addition to the driving transistor Tdr.

The pixel driving circuit layer PDCL can include at least one electrode layer and at least one insulation layer.

For example, when the driving transistor Tdr, as illustrated in FIG. 8, includes an active layer AC, a gate insulation layer 103, and a gate electrode G, the pixel driving circuit layer PDCL can include a first electrode layer including the active layer AC, a second electrode layer including the gate electrode G, a first insulation layer including the gate insulation layer 103, a second insulation layer including a first passivation layer 104 covering the gate electrode G, and a third insulation layer including a second passivation layer 105 covering the first passivation layer 104.

The active layer AC can be formed of a semiconductor, and both ends of the active layer AC can be a first terminal and a second terminal of the driving transistor Tdr.

As described above, the first terminal of the driving transistor Tdr can be connected to the first voltage supply line PLA to which the first voltage EVDD is supplied, and the second terminal of the driving transistor Tdr can be connected to the light emitting device ED, and particularly, can be connected to the anode AN configuring the light emitting device ED.

A light blocking plate LS for blocking light introduced from the substrate 101 can be further provided in an area of an upper end of the substrate 101 corresponding to the active layer AC of the driving transistor Tdr. Also, light blocking plates LS can be further provided at lower ends of the switching transistor Tsw1 and the sensing transistor Tsw2. The light blocking plate LS can be covered by the buffer 102, and the active AC can be provided at an upper end of the buffer 102.

Each of the gate insulation layer 103, the first passivation layer 104, and the second passivation layer 105 can be formed of at least one of various types of organic layers, or can be formed of at least one of various types of inorganic layers, or can be formed of at least one organic layer and at least one inorganic layer.

The gate electrode G can include at least one of various metallic materials such as aluminum and tungsten.

The planarization layer 106 can perform a function of planarizing the upper end of the pixel driving circuit layer PDCL. The planarization layer 106 can be formed of at least one of various types of organic layers, or can be formed of at least one of various types of inorganic layers, or can be formed of at least one organic layer and at least one inorganic layer.

The anode AN can be provided on the planarization layer 106. The anode AN can be provided for each pixel, and the anodes AN are separated from each other.

The bank BK covers ends of the anodes AN. The bank BK can be formed of at least one of an organic material and an inorganic material.

Light can be output to the outside through an area of the anode AN which is not covered by the bank BK.

The light emitting layer EL can be provided at upper ends of the anode AN and the bank BK.

The light emitting layer EL can be covered by the cathode CA.

The cathode CA can be covered by the encapsulation layer 107. The encapsulation layer 107 can perform a function of protecting the light emitting device ED from oxygen or moisture introduced from the outside.

The encapsulation layer 107 can be formed of at least one of various types of organic layers, or can be formed of at least one of various types of inorganic layers, or can be formed of at least one organic layer and at least one inorganic layer.

A color filter displaying various colors can be provided in the encapsulation layer 107 or can be provided in the planarization layer 106.

Finally, the touch electrode unit 100b can include touch electrodes TE for touch sensing, and the touch electrodes TE can include touch driving electrodes TX and touch receiving electrodes RX, as illustrated in FIGS. 7A and 7B.

For example, the touch electrode unit 100b, as illustrated in FIGS. 7A and 7B, can include touch driving electrodes TX provided on the light emitting device unit 100a along a first direction X parallel to the gate lines GLs and touch receiving electrodes RX provided on the light emitting device unit 100a along a second direction Y different from the first direction X. Here, the first direction X can mean an X-axis direction illustrated in FIGS. 1, 7A, and 7B, and the second direction Y can mean a Y-axis direction illustrated in FIGS. 1, 7A, and 7B.

Each of the touch driving electrodes TX can be connected to the touch driver 800 through a touch driving electrode line TXL, and each of the touch receiving electrodes RX can be connected to the touch driver 800 through a touch receiving electrode line RXL.

The touch driving electrodes TX and the touch receiving electrodes RX can be provided in the touch electrode unit 100b in various structures.

For example, as illustrated in FIGS. 7A and 8, the touch electrode unit 100b can include touch driving electrodes TX provided on the encapsulation layer 107 of the light emitting device unit 100a along the first direction X parallel to the gate lines GL, touch insulation layer 108 covering the touch driving electrodes TX, touch receiving electrodes RX provided on the touch insulation layer 108 along the second direction Y different from the first direction X, and touch passivation layer 109 covering the touch receiving electrodes RX.

In this case, the touch driving electrode TX can be formed of one metal layer, the touch receiving electrode RX can also be formed of one metal layer, and the touch driving electrode TX and the touch receiving electrode RX can be provided on the encapsulation layer 107 with the touch insulation layer 108 interposed therebetween.

However, as illustrated in FIG. 7B, the touch driving electrode TX can include touch driving auxiliary electrodes TXAE provided on the encapsulation layer 107 along the first direction X and touch driving connection electrodes TXCL connecting the separated touch driving auxiliary electrodes TXAE. Also, the touch receiving electrode RX can include touch receiving auxiliary electrodes RXAE provided on the encapsulation layer 107 along the second direction Y and touch receiving connection electrodes RXCL connecting the separated touch receiving auxiliary electrodes RXAE.

Each of the touch driving auxiliary electrodes TXAE can be formed in any one of various shapes of polygons such as diamonds and squares.

Each of the touch receiving auxiliary electrodes RXAE can be formed in any one of various shapes of polygons such as a diamond mode and a square.

In this case, the touch driving auxiliary electrodes TXAE, the touch driving connection electrodes TXCL, and the touch receiving auxiliary electrodes RXAE can be provided on the encapsulation layer 107, the touch driving auxiliary electrodes TXAE, the touch driving connection electrodes TXCL, and the touch receiving auxiliary electrodes RXAE can be covered by the touch insulation layer, the touch receiving connection electrodes RXCL can be provided on the touch insulation layer, and the touch receiving connection electrodes RXCL can be covered by the touch passivation layer.

In this case, two adjacent touch receiving auxiliary electrodes RXAE can be connected by the touch receiving connection electrode RXCL.

As another example, the touch receiving connection electrodes RXCL can be provided on the encapsulation layer 107, the touch receiving connection electrodes RXCL can be covered by the touch insulation layer, touch driving auxiliary electrodes TXAE, touch driving connection electrodes TXCL, and touch receiving auxiliary electrodes RXAE can be provided on the touch insulation layer, and touch driving auxiliary electrodes TXAE, touch driving connection electrodes TXCL, and touch receiving auxiliary electrodes RXAE can be covered by the touch passivation layer.

In this case, two adjacent touch receiving auxiliary electrodes RXAE can be connected by the touch receiving connection electrode RXCL.

In addition to the above-described examples, the touch driving electrodes TX and the touch receiving electrodes RX can be provided on the light emitting device unit 100*a* in various structures.

Figure 9:
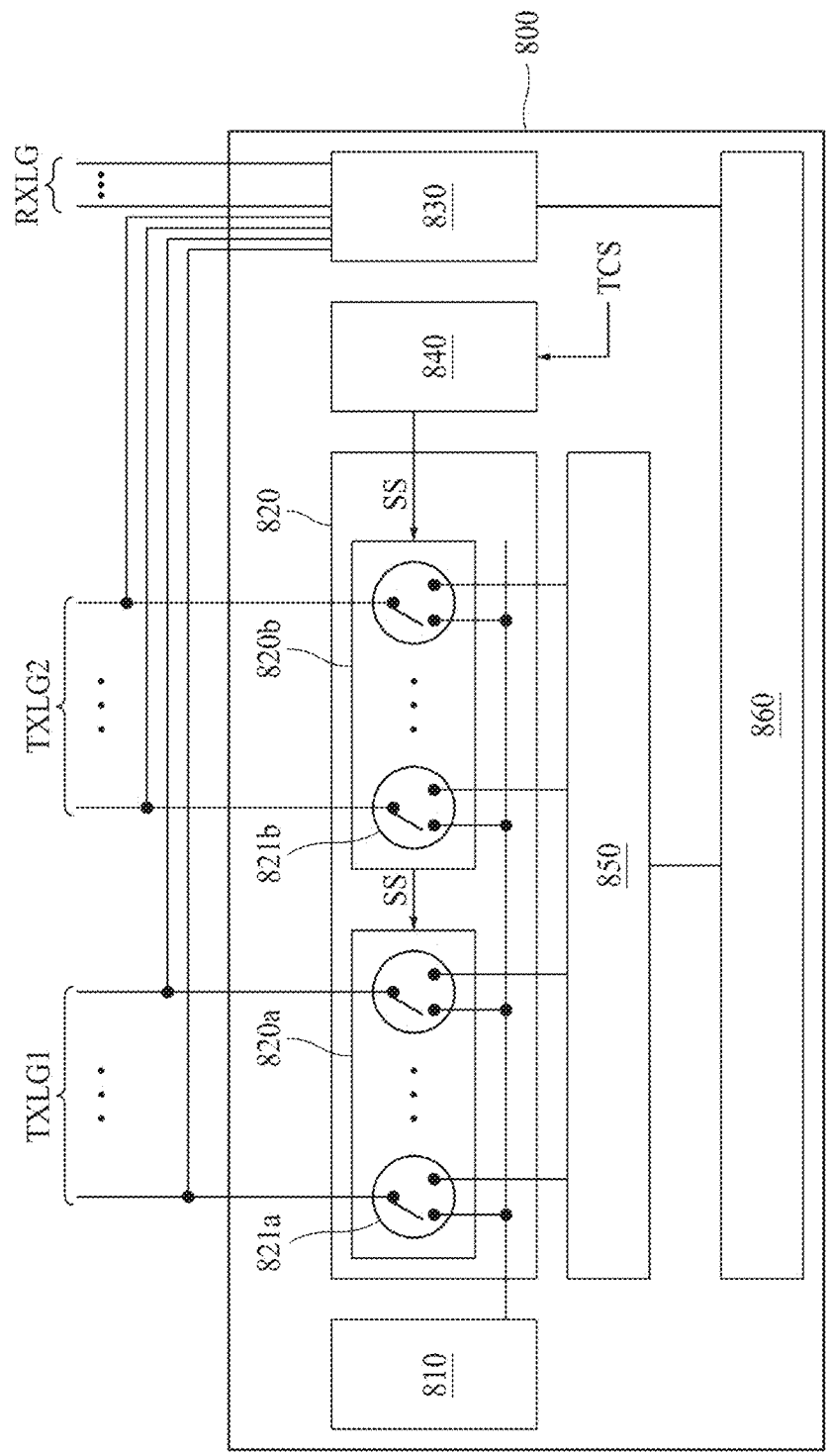
FIG. 9 is an exemplary diagram illustrating a structure of a touch driver applied to a light emitting display apparatus according to an embodiment of the present disclosure.

FIG. 9 is an exemplary diagram illustrating a structure of a touch driver applied to a light emitting display apparatus according to an embodiment of the present disclosure.

A touch driver 800 applied to a light emitting display apparatus according to an embodiment of the present disclosure can include, as illustrated in FIG. 9, an uplink signal generation unit 810 (e.g., a circuit) for generating an uplink signal in a pen touch sensing mode for sensing a pen touch, a switching unit 820 (e.g., a circuit) for connecting at least one of first area touch driving electrodes to the uplink signal generation unit 810 or connecting at least one of second area touch driving electrodes to the uplink signal generation unit 810, and a touch sensing unit 830 (e.g., a circuit) for converting pen touch sensing signals received from the touch driving electrodes TX and the touch receiving electrodes RX into digital values.

In addition, the touch driver 800 can further include a touch driving signal generation unit 850 (e.g., a circuit) which generates touch driving signals to be transmitted to the touch driving electrodes TX in a finger touch sensing mode for sensing finger touch.

In addition, the touch driver 800 can further include a switching control unit 840 (e.g., a circuit) which generates a switching control signal SS for controlling the switching unit 820 and a touch control unit 860 (e.g., a circuit) for communicating with the control driver 400.

First, the pen touch sensing mode means a mode in which the touch driver 800 senses a pen touch. The finger touch sensing mode means a mode in which the touch driver 800 senses a finger touch.

In a light emitting display apparatus according to an embodiment of the present disclosure, the touch driver 800 can sense only a pen touch, or can sense a pen touch and a finger touch.

When the touch driver 800 senses a pen touch and a finger touch, the pen touch sensing mode and the finger touch sensing mode do not occur simultaneously.

For example, a finger touch can be sensed in the finger touch sensing mode, and if a finger touch is not sensed in the finger touch sensing mode, a pen touch can be sensed by executing a pen touch sensing mode. If a pen touch is not sensed in the pen touch sensing mode, the finger touch sensing mode can be executed again.

The uplink signal means a signal transmitted from the light emitting display panel 100 to the touch pen in the pen touch sensing mode.

For example, the uplink signal can include information (hereinafter, simply referred to as pen touch start timing information) on a start timing for sensing the pen touch.

A touch pen receiving the uplink signal can output a downlink signal, and a light emitting display apparatus can determine the position of the touch pen on the light emitting display panel 100 by using the downlink signal.

The first area touch driving electrodes 1AR_TX refer to touch driving electrodes TX provided in a first area 1st AR among the touch driving electrodes TX, and the second area touch driving electrodes 2AR_TX refer to touch driving electrodes TX provided in a second area 2nd AR among the touch driving electrodes TX.

For example, the touch electrode unit 100*b* can include at least two areas, and each of the at least two areas can be provided in parallel to the gate lines GL.

Hereinafter, for convenience of description, a light emitting display apparatus according to an embodiment of the present disclosure will be described using a touch electrode unit 100*b* including the first area 1st AR and the second area 2nd AR, as illustrated in FIGS. 7A and 7B.

For example, the touch electrode unit 100*b* can include, as illustrated in FIGS. 1, 7A and 7B, the first area 1st AR and the second area 2nd AR, and each of the first area 1st AR and the second area 2nd AR can be provided in parallel to the gate lines GL.

In this case, the touch driving electrodes TX can include first area touch driving electrodes 1AR_TX provided in the first area 1st AR and second area touch driving electrodes 2AR_TX provided in the second area 2nd AR.

Next, the uplink signal generation unit 810 can generate an uplink signal by using the power supplied through the power supply unit 500. The uplink signal can be formed in the form of, for example, an aperiodic pulse.

Next, the switching unit 820 can connect at least one of the first area touch driving electrodes 1AR_TX to the uplink signal generation unit 810 or at least one of the second area touch driving electrodes 2AR_TX to the uplink signal generation unit 810.

To this end, the switching unit 820 can include a first area switching unit 820*a* for connecting at least one of the first area touch driving electrodes 1AR_TX to the uplink signal generation unit 810 and a second area switching unit 820*b* for connecting at least one of the second area touch driving electrodes 2AR_TX to the uplink signal generation unit 810.

The first area touch driving electrodes 1AR_TX and the second area touch driving electrodes 2AR_TX are connected to the switching unit 820 through touch driving electrode lines TXL.

In this case, touch driving electrode lines TXL connected to the first area touch driving electrodes 1AR_TX are referred to as first group touch driving electrode lines TXLG1, and touch driving electrode lines TXL connected to the second area touch driving electrodes 2AR_TX are referred to as second group touch driving electrode lines TXLG2.

Accordingly, the first group touch driving electrode lines TXLG1 can be connected to the first area switching unit 820a, and the second group touch driving electrode lines TXLG2 can be connected to the second area switching unit 820b.

The first area switching unit 820a can include first switches 821a connected between each of the first group touch driving electrode lines TXLG1 and the uplink signal generation unit 810.

The second area switching unit 820b can include second switches 821b connected between each of the second group touch driving electrode lines TXLG2 and the uplink signal generation unit 810.

Next, at least one of the first switches 821a can connect at least one of the first area touch driving electrodes 1AR_TX to the uplink signal generation unit 810 depending on a switching control signal SS.

At least one of the second switches 821b can connect at least one of the second area touch driving electrodes 2AR_TX to the uplink signal generation unit 810 depending on a switching control signal SS.

The switching control signal SS can be generated by the switching control unit 840, or can be a touch control signal TCS transmitted from the control driver 400.

For example, the touch control signal TCS generated by the control driver 400 can directly control the first switches 821a and the second switches 821b, and in this case, the touch control signal TCS can be used as the switching control signal SS.

The touch control signal TCS generated by the control driver 400 can be transmitted to the switching control unit 840, and the switching control unit 840 can generate the switching control signal SS depending on the touch control signal TCS. The first switches 821a and the second switches 821b can be controlled by the switching control signal SS generated by the switching control unit 840.

The touch control signal TCS can be directly transmitted to the switching control unit 840, but when the touch driver 800 includes a touch control unit 860, the touch control signal TCS can be transmitted to the switching control unit 840 through the touch control unit 860.

In this case, the touch control unit 860 can simply perform a function of transmitting the touch control signal TCS to the switching control unit 840.

However, the touch control unit 860 can perform a function of controlling the switching control unit 840 depending on the touch control signal TCS. For example, the touch control unit 860 can generate a control signal for controlling the switching control unit 840 according to the touch control signal TCS, and the switching control unit 840 can generate a switching control signal SS according to the control signal generated by the touch control unit 860.

Also, in the finger touch sensing mode, the first switches 821a and the second switches 821b are sequentially turned on according to the switching control signal SS to sequentially connect the touch driving electrodes TX to the touch driving signal generation unit 850.

Accordingly, touch driving signals can be sequentially supplied to the touch driving electrodes TX to determine whether a finger touch occurs.

In this case, the switching control signal SS in the finger touch sensing mode FM can be generated by the switching control unit 840 depending on the touch control signal TCS, similar to the switching control signal SS in the pen touch sensing mode PM.

Next, the touch sensing unit 830 can convert pen touch sensing signals received from the touch driving electrodes TX and the touch receiving electrodes RX into digital values.

For example, when an uplink signal is transmitted to a touch pen through the touch electrode unit 100b, the touch pen can output a downlink signal.

The downlink signal output from the touch pen can be transmitted to the touch sensing unit 830 through at least one of the touch driving electrodes TX and at least one of the touch receiving electrodes RX.

Signals transmitted to the touch sensing unit 830 through at least one of the touch driving electrodes TX and at least one of the touch receiving electrodes RX depending on the downlink signal are referred to as pen touch sensing signals.

To this end, the touch driving electrodes TX and the touch receiving electrodes RX can be connected to the touch sensing unit 830.

For example, the first group touch driving electrode lines TXLG1 and the second group touch driving electrode lines TXLG2 are connected to the touch sensing unit 830, and all of the touch receiving electrode lines RXL are connected to the touch sensing unit 830. All of the touch receiving electrode lines RXL are referred to as touch receiving electrode line groups RXLG.

When uplink signals are supplied to the touch driving electrodes TX, the touch driving electrodes TX can be separated from the touch sensing unit 830, and when pen touch sensing signals are transmitted from the touch driving electrodes TX to the touch sensing unit 830, the touch driving electrodes TX can be connected to the touch sensing unit 830.

To this end, switches capable of connecting the touch driving electrodes TX to the touch sensing unit 830 or separating the touch driving electrodes TX from the touch sensing unit 830 can be provided in the touch driver 800, the touch sensing unit 830, or the non-display area NDA.

The touch sensing unit 830 can convert pen touch sensing signals transmitted through at least one of the touch driving electrodes TX and at least one of the touch receiving electrodes RX into digital values.

Pen touch sensing signals can be used to determine a coordinate at which a pen touch occurs.

For example, the touch sensing unit 830 can directly determine a coordinate at which the pen touch occurs by using digital values corresponding to the pen touch sensing signals.

However, digital values corresponding to the pen touch sensing signals can be transmitted to the touch control unit 860 provided in the touch driver 800, and the touch control unit 860 can determine a coordinate at which a pen touch occurs by using the digital values.

Also, the touch controller 860 can transmit the digital values to the control driver 400. In this case, the control driver 400 can determine the coordinate at which the pen touch occurs, using the digital values.

Next, as described above, the touch driver 800 can further include the touch control unit 860.

The touch control unit 860 can control the uplink signal generation unit 810, the sensing control unit 840, and the touch sensing unit 830.

The touch control unit 860 can communicate with the control driver 400. For example, the touch control unit 860 can control the uplink signal generation unit 810, the sensing control unit 840, and the touch sensing unit 830 according to the touch control signal TCS received from the control driver 400, and can transmit digital values or coordinate information generated by the touch sensing unit 830 to the control driver 400.

Also, when the touch driver 800 further includes the touch driving signal generation unit 850, the touch driver 800 can control the touch driving signal generation unit 850.

Finally, the touch driver 800 can further include the touch driving signal generation unit 850 which generates touch driving signals to be transmitted to the touch driving electrodes TX in the finger touch sensing mode for sensing a finger touch.

The touch driving signal generation unit 850 can generate touch driving signals using power transmitted from the power supply unit 500.

When the touch driving signal generation unit 850 is provided in the touch driver 800, in the finger touch sensing mode, the switching unit 820 can sequentially connect the touch driving electrodes TX to the touch driving signal generation unit 850.

Accordingly, the touch driving signals can be sequentially supplied to the touch driving electrodes TX.

For example, the switching unit 820 can sequentially connect the touch driving electrodes TX to the touch driving signal generation unit 850 under the control of the switching control unit 840. Accordingly, the touch driving signals can be sequentially transmitted to the touch driving electrodes TX.

In the finger touch sensing mode, the touch sensing unit 830 can convert finger touch sensing signals based on touch driving signals received from the touch receiving electrodes RX into digital values.

Digital values corresponding to finger touch sensing signals can be used to determine a coordinate at which a finger touch is generated.

For example, by a method similar to the method of determining a coordinate at which a pen touch is generated using digital values corresponding to pen touch sensing signals, a coordinate at which a finger touch is generated can be determined using digital values corresponding to finger touch sensing signals.

Figure 10:
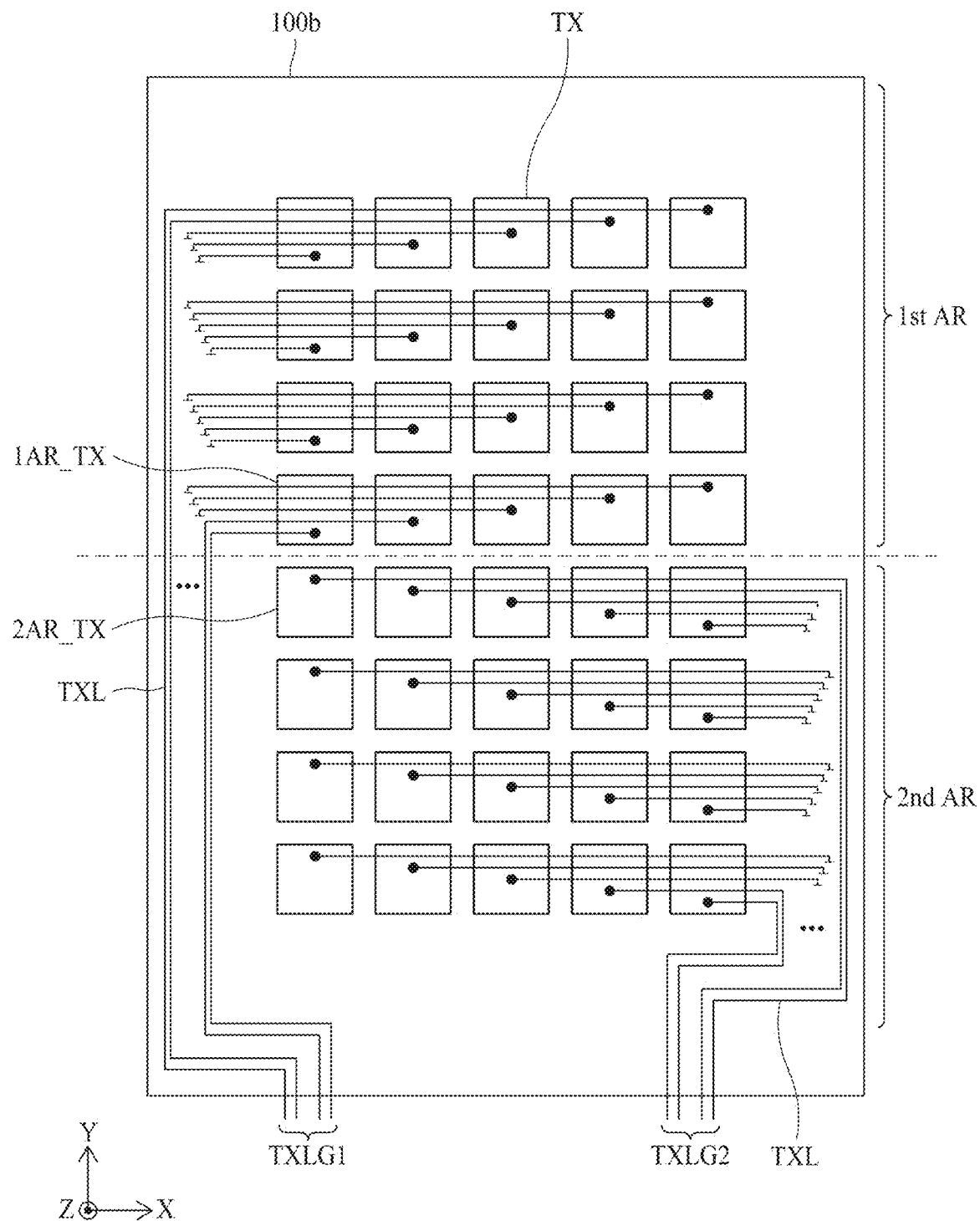
FIG. 10 is another exemplary diagram illustrating a structure of a touch electrode unit illustrated in FIG. 6B according to an embodiment of the present disclosure.

FIG. 10 is another exemplary diagram illustrating a structure of a touch electrode unit illustrated in FIG. 6B. In the following descriptions, details which are the same as or similar to details described with reference to FIGS. 1 to 9 are omitted or will be simply described. Also, in the following descriptions, components performing the same or similar function as those illustrated in FIG. 9 are described by using the same reference numerals as those illustrated in FIG. 9.

For example, the touch electrode unit 100b described with reference to FIGS. 1 to 9 includes touch driving electrodes TX provided in a first direction and touch receiving electrodes RX provided in a second direction, and this structure is called a mutual-cap structure.

In a light emitting display apparatus having the mutual-cap structure, an uplink signal can be transmitted to a pen through at least one of the touch driving electrodes TX, and a coordinate in which a pen touch is generated can be determined using a pen touch sensing signal received from at least one of the touch driving electrodes TX and at least one of the touch receiving electrodes RX.

However, a light emitting display apparatus according to an embodiment of the present disclosure can use a touch electrode unit 100b having a self-cap structure.

For example, the touch electrode unit 100b having the self-cap structure can include only touch driving electrodes TX separated from each other, as illustrated in FIG. 10.

In this case, each of the touch driving electrodes TX can be connected to the touch driver 800 through the touch driving electrode line TXL.

For example, the touch electrode unit 100b can include at least two areas, and each of the at least two areas can be provided in parallel to the gate lines GL.

Hereinafter, for convenience of description, a light emitting display apparatus according to an embodiment of the present disclosure will be described using a touch electrode unit 100b including a first area 1st AR and a second area 2nd AR, as illustrated in FIG. 10.

First, the touch electrode unit 100b can include a first area 1st AR and a second area 2nd AR, as illustrated in FIG. 10, and each of the first area 1st AR and the second area 2nd AR can be provided in parallel to the gate lines GL.

In this case, the touch driving electrodes TX can include first area touch driving electrodes 1AR_TX provided in the first area 1st AR and second area touch driving electrodes 2AR_TX provided in the second area 2nd AR.

The touch driving electrode lines TXL connected to the first area touch driving electrodes 1AR_TX can extend from the first area touch driving electrodes 1AR_TX to the non-display area along a first direction parallel to the gate lines GL1 to GLg, as illustrated in FIGS. 1 and 10, and can be connected to the touch driver 800 through the non-display area.

Also, as illustrated in FIGS. 1 and 10, the touch driving electrode lines TXL connected to the second area touch driving electrodes 2AR_TX can also extend from the second area touch driving electrodes 2AR_TX to the non-display area along the first direction parallel to the gate lines GL1 to GLg, and can be connected to the touch driver 800 through the non-display area.

Accordingly, touch driving electrode lines TXL connected to the first area touch driving electrodes 1AR_TX do not overlap gate lines provided in the second area, and touch driving electrode lines TXL connected to the second area touch driving electrodes 2AR_TX do not overlap gate lines provided in the first area.

Accordingly, gate pulses supplied to the gate lines GL1 to GLg are not affected by uplink signals supplied to the touch driving electrode lines TXL.

Next, the uplink signal generation unit 810 can generate an uplink signal using power supplied through the power supply unit 500. The uplink signal can be formed in the form of, for example, an aperiodic pulse.

Next, the switching unit 820 can connect at least one of the first area touch driving electrodes 1AR_TX to the uplink signal generation unit 810 or at least one of the second area touch driving electrodes 2AR_TX to the uplink signal generation unit 810.

To this end, the switching unit 820 can include a first area switching unit 820a for connecting at least one of the first area touch driving electrodes 1AR_TX to the uplink signal generation unit 810 and a second area switching unit 820b for connecting at least one of the second area touch driving electrodes 2AR_TX to the uplink signal generation unit 810.

The first area touch driving electrodes 1AR_TX and the second area touch driving electrodes 2AR_TX are connected to the switching unit 820 through touch driving electrode lines TXL.

In this case, touch driving electrode lines TXL connected to the first area touch driving electrode 1AR_TX are referred to as first group touch driving electrode lines TXLG1, and touch driving electrode lines TXL connected to the second area touch driving electrode 2AR_TX are referred to as second group touch driving electrode lines TXLG2.

Therefore, as illustrated in FIG. 9, the first group touch driving electrode lines TXLG1 can be connected to the first area switching unit 820a, and the second group touch driving electrode lines TXLG2 can be connected to the second area switching unit 820b.

The first area switching unit 820a can include first switches 821a connected between each of the first group touch driving electrode lines TXLG1 and the uplink signal generation unit 810.

The second area switching unit 820b can include second switches 821b connected between each of the second group touch driving electrode lines TXLG2 and the uplink signal generation unit 810.

Next, at least one of the first switches 821a can connect at least one of the first area touch driving electrodes 1AR_TX to the uplink signal generation unit 810 according to a switching control signal SS.

At least one of the second switches 821b can connect at least one of the second area touch driving electrodes 2AR_TX to the uplink signal generation unit 810 according to a switching control signal SS.

The switching control signal SS can be generated by the switching control unit 840 or can be a touch control signal TCS transmitted from the control driver 400, as described with reference to FIG. 9.

For example, the touch control signal TCS generated by the control driver 400 can directly control the first switches 821a and the second switches 821b, and in this case, the touch control signal TCS can be used as the switching control signal SS.

The touch control signal TCS generated by the control driver 400 can be transmitted to the switching control unit 840, and the switching control unit 840 can generate the switching control signal SS according to the touch control signal TCS. The first switches 821a and the second switches 821b can be controlled by the switching control signal SS generated by the switching control unit 840.

The touch control signal TCS can be directly transmitted to the switching control unit 840, but when the touch driver 800 includes the touch control unit 860, the touch control signal TCS can be transmitted to the switching control unit 840 through the touch control unit 860.

In this case, the touch control unit 860 can simply perform a function of transmitting the touch control signal TCS to the switching control unit 840.

However, the touch control unit 860 can perform a function of controlling the switching control unit 840 according to the touch control signal TCS. For example, the touch control unit 860 can generate a control signal for controlling the switching control unit 840 according to the touch control signal TCS, and the switching control unit 840 can generate the switching control signal SS according to the control signal generated by the touch control unit 860.

Next, the touch sensing unit can convert pen touch sensing signals received from the touch driving electrodes TX into digital values.

For example, when an uplink signal is transmitted to a touch pen through the touch electrode unit 100b, the touch pen can output a downlink signal.

The downlink signal output from the touch pen can be transmitted to the touch sensing unit through at least one of the touch driving electrodes TX. Signals transmitted to the touch sensing unit through at least one of the touch driving electrodes TX depending on the downlink signal are referred to as pen touch sensing signals.

The touch sensing unit can convert pen touch sensing signals transmitted through at least one of the touch driving electrodes TX into digital values.

The pen touch sensing signals can be used to determine coordinate at which the pen touch is generated.

For example, the touch sensing unit can directly determine a coordinate at which the pen touch is generated by using digital values corresponding to the pen touch sensing signals.

However, digital values corresponding to pen touch sensing signals can be transmitted to the touch control unit 860 provided in the touch sensing unit, and the touch control unit 860 can determine a coordinate at which a pen touch is generated by using the digital values.

Also, the touch control unit 860 can transmit the digital values to the control driver 400. In this case, the control driver 400 can determine a coordinate at which a pen touch occurs, using the digital values.

To provide an additional description, in the touch driver 800 illustrated in FIG. 9, the touch sensing unit 830 is connected to the touch driving electrodes TX and the touch receiving electrodes RX.

However, a touch driver 800 of a light emitting display apparatus to which the self-cap type touch electrode unit 100b illustrated in FIG. 10 is applied is connected only to the touch driving electrodes TX, as described above.

Therefore, in the touch driver 800 of the light emitting display apparatus to which the self-cap type touch electrode unit 100b illustrated in FIG. 10 is applied, the touch sensing unit can be connected to the touch driving electrodes TX through the switching unit 820.

For example, the switching unit 820 can connect the uplink signal generation unit 810 to the touch driving electrodes TX at a time when the uplink signal or the touch driving signal is supplied to the touch driving electrodes TX, and can connect the touch driving electrodes TX to the touch sensing unit at a time when the pen touch sensing signal or the finger touch sensing signal is received.

In this case, the touch sensing unit which receives the pen touch sensing signal or the finger touch sensing signal from the touch driving electrodes TX can convert the pen touch sensing signal or the finger touch sensing signal into a digital value.

Next, the touch driver 800 can further include a touch control unit 860.

The touch control unit 860 can control the uplink signal generation unit 810, the sensing control unit 840, and the touch sensing unit 830.

The touch control unit 860 can communicate with the control driver 400. For example, the touch control unit 860 can control the uplink signal generation unit 810, the sensing control unit 840, and the touch sensing unit according to the touch control signal TCS received from the control driver 400, and can transmit digital values generated by the touch sensing unit 830 to the control driver 400.

Also, when the touch driver 800 further includes a touch driving signal generation unit 850, the touch driver 800 can control the touch driving signal generation unit 850.

Finally, the touch driver 800 can further include the touch driving signal generation unit 850 which generates touch driving signals to be transmitted to the touch driving electrodes TX in the finger touch sensing mode for sensing a finger touch.

The touch driving signal generation unit 850 can generate touch driving signals using power transmitted from the power supply unit 500.

When the touch driving signal generation unit 850 is provided in the touch driver 800, in the finger touch sensing mode, the switching unit 820 can simultaneously transmit touch driving signals to the touch driving electrodes TX.

For example, the switching unit 820 can simultaneously connect the touch driving electrodes TX to the touch driving signal generation unit 850 under the control of the switching control unit 840. Accordingly, the touch driving signals can be simultaneously transmitted to the touch driving electrodes TX.

In the finger touch sensing mode, the touch sensing unit can convert finger touch sensing signals based on touch driving signals received from the touch driving electrodes TX through the switching unit 820 into digital values.

Digital values corresponding to finger touch sensing signals can be used to determine a coordinate at which a finger touch is generated.

For example, by a method similar to the method of determining a coordinate at which a pen touch is generated using digital values corresponding to pen touch sensing signals, a coordinate at which a finger touch is generated can be determined using digital values corresponding to finger touch sensing signals.

Hereinafter, for convenience of description, as illustrated in FIGS. 7A and 7B, a light emitting display apparatus including a touch electrode unit 100*b* having a mutual-cap structure is described as an example of a light emitting display apparatus according to an embodiment of the present disclosure.

Figure 11:
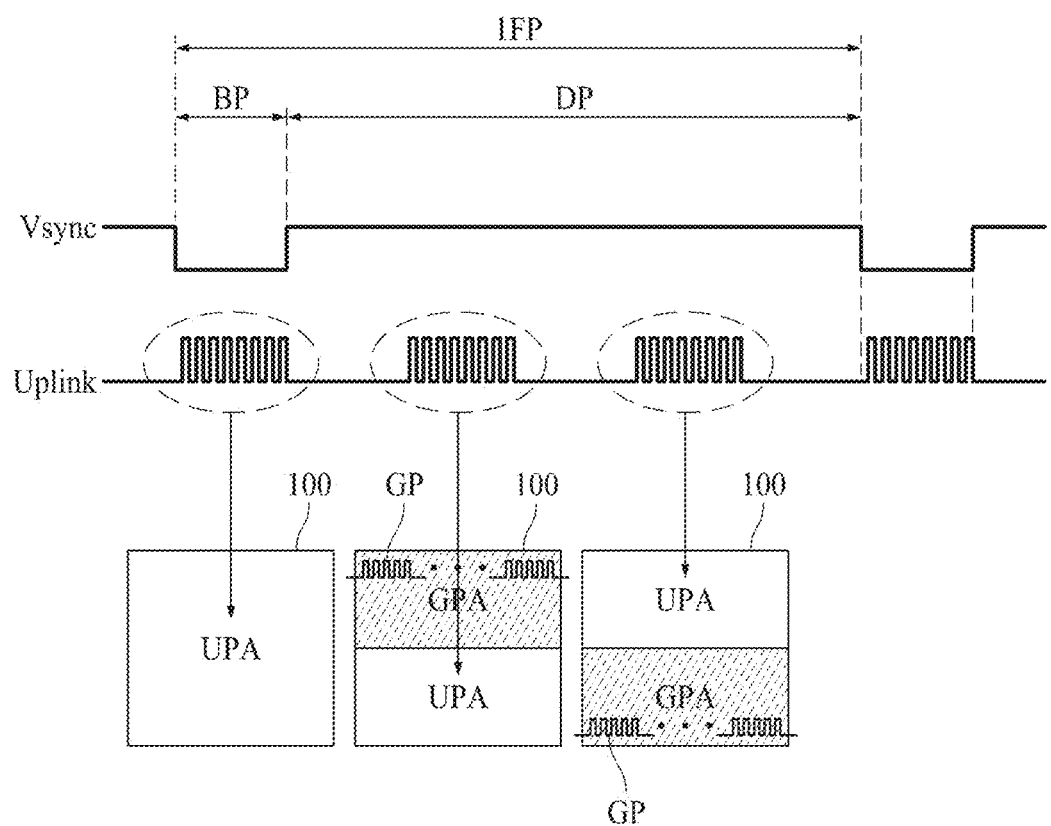
FIG. 11 is an exemplary diagram for explaining a basic operation method of a light emitting display apparatus according to an embodiment of the present disclosure.

FIG. 11 is an exemplary diagram for explaining a basic operation method of a light emitting display apparatus according to an embodiment of the present disclosure. In the following descriptions, details which are the same as or similar to details described with reference to FIGS. 1 to 10 are omitted or will be simply described.

A light emitting display apparatus according to an embodiment of the present disclosure includes a light emitting device unit 100*a* provided with light emitting devices ED and gate lines GL1 to GLg, a touch electrode unit 100*b* including touch driving electrodes TX provided on the light emitting device unit 100*a*, and a touch driver 800 which senses a touch by driving the touch electrode unit 100*b*.

In this case, the touch electrode unit 100*b* can include at least two areas. Hereinafter, for convenience of description, a light emitting display apparatus according to an embodiment of the present disclosure will be described using the touch electrode unit 100*b* including the first area 1st AR and the second area 2nd AR, as illustrated in FIGS. 7A, 7B and 10.

Each of the first area 1st AR and the second area 2nd AR is provided in parallel to the gate lines GL1 to GLg.

In a one-frame period 1FP, the touch driver 800 can supply an uplink signal to the touch driving electrode TX provided in the first area 1st AR or the second area 2nd AR during ae display period DP in which an image is output from the light emitting device unit 100*a*.

The display period DP refers to a period in which one image is displayed by the light emitting devices ED provided in the light emitting device unit 100*a*.

One-frame period 1FP includes the display period DP and a blank period BP. The blank period BP is provided between the display periods DP, and during the blank period BP, the gate pulse GP is not supplied to the light emitting device unit 100*a*.

In the following description, a first frame period means an order of one-frame periods 1FP. For example, a one-frame period 1FP generated for the first time is referred to as a first frame period, and another one-frame period 1FP generated after the first frame period is referred to as a second frame period.

An uplink signal Uplink refers to a signal transmitted from the light emitting display panel 100 to a touch pen in the pen touch sensing mode.

A pen touch sensing mode means a period in which a pen touch is sensed, and a finger touch sensing mode means a period in which a finger touch is sensed.

For example, the uplink signal Uplink is supplied to the touch electrode unit 100*b* only in the pen touch sensing mode.

In a light emitting display apparatus according to an embodiment of the present disclosure, only a pen touch can be sensed, or a pen touch and a finger touch can be sensed alternately. For example, in FIG. 11, one-frame period 1FP in a light emitting display apparatus in which only a pen touch is sensed is illustrated.

The one-frame period 1FP can be divided by a vertical synchronization signal Vsync.

The vertical synchronization signal Vsync can be supplied from the external system 600 to the control driver 400, and the control driver 400 can generate the vertical synchronization signal Vsync using the timing synchronization signal TSS transmitted from the external system 600.

A pen touch and a finger touch can be determined by the touch electrode unit 100*b*, and an image can be displayed by the light emitting device unit 100*a*. Therefore, as illustrated in FIG. 11, the pen touch mode can be performed independently of the display period DP.

For example, as illustrated in FIG. 11, the generation of three uplink signals Uplink in a one-frame period 1FP can mean that the pen touch is sensed through three sensing periods in the one-frame period 1FP.

That is, in each of the pen touch sensing modes, the touch driver 800 supplies an uplink signal Uplink to the touch electrode unit 100*b*, and when a preset period elapses after the uplink signal Uplink is supplied, a downlink signal can be received from the pen.

Receiving a downlink signal means there is a pen touch, and not receiving a downlink signal means no pen touch.

As illustrated in FIG. 11, the uplink signal can be supplied to the touch electrode unit 100*b* during the blank period BP, and can be supplied to the touch electrode unit 100*b* during the display period DP.

That is, in a light emitting display apparatus according to an embodiment of the present disclosure, a pen touch can be sensed at least once not only during the blank period BP but also during the display period DP.

Gate pulses are sequentially supplied to the gate lines GL1 to GLg during the display period DP.

Hereinafter, for convenience of description, gate lines provided in the first area 1st AR are referred to as first area gate lines, and gate lines provided in the second area 2nd AR are referred to as second area gate lines.

In particular, in a light emitting display apparatus according to an embodiment of present disclosure, the uplink signal Uplink can be supplied to the first area 1st AR or the second area 2nd AR to prevent noise from being included in the gate pulse GP by the uplink signal Uplink supplied to the touch electrode unit 100*b* during the display period DP.

For example, the touch driver 800 can transmit an uplink signal to the second area touch driving electrodes 2AR_TX provided in the second area 2nd AR during a period in which the gate pulses GP are sequentially supplied to the first area gate lines provided in the first area 1st AR in the display period DP.

Moreover, the touch driver 800 can transmit an uplink signal to the first area touch driving electrodes 1AR_TX provided in the first area 1st AR during a period in which the gate pulses GP are sequentially supplied to the second area gate lines provided in the second area 2nd AR in the display period DP.

Therefore, the gate pulses GP supplied to the first area 1st AR are not affected by the uplink signal, and the gate pulses GP supplied to the second area 2nd AR are also not affected by the uplink signal.

Accordingly, light emitting devices ED provided in the first area 1st AR can normally output lights, and light emitting devices ED provided in the second area 2nd AR can also normally output lights, so that a normal image can be displayed through the first area 1st AR and the second area 2nd AR.

To provide an additional description, in the display period DP, the gate pulse GP is not supplied to an area corresponding to an area of the light emitting device unit 100*a* to which the uplink signal is supplied. Accordingly, a defect, in which a noise is included in a gate pulse GP and thus an abnormal image is displayed, does not occur.

For example, in FIG. 11, an area indicated by GPA, which is a reference numeral, means an area in which gate pulses GP are supplied (hereinafter, simply referred to as a gate pulse area), and an area indicated by UPA, which is a reference numeral, means an area in which uplink signals are supplied (hereinafter, simply referred to as an uplink signal area).

However, during the blank period BP, the gate pulse GP is not supplied to the light emitting device unit 100*a*. Accordingly, during the blank period BP, the touch driver 800 can supply uplink signals to the first area touch driving electrodes 1AR_TX provided in the first area 1st AR and the second area touch driving electrodes 2AR_TX provided in the second area 2nd AR.

Accordingly, during the blank period BP, as illustrated in FIG. 11, all areas of the light emitting display panel 100 can be the uplink signal area UPA.

During the display period DP, the uplink signal Uplink can be supplied to all of the first area touch driving electrodes 1AR_TX, but can be supplied only to some of the first area touch driving electrodes 1AR_TX.

For example, when the area or width of a pen in contact with the touch electrode unit 100*b* is greater than the area or width of the touch driving electrode TX, the uplink signal Uplink can be supplied only to some of the first area touch driving electrodes 1AR_TX.

In this case, the uplink signal Uplink can be supplied only to a part of the second area touch driving electrodes 2AR_TX.

Also, during the blank period BP, the uplink signal Uplink can be supplied only to some of the touch driving electrodes TXs.

To provide an additional description, the touch driver 800 can supply an uplink signal to at least one of the first area touch driving electrodes 1AR_TX or supply an uplink signal to at least one of the second area touch driving electrodes 2AR_TX during the display period DP.

However, a light emitting display apparatus according to an embodiment of the present disclosure is not limited thereto. For example, the touch electrode unit 100*b* can be divided into at least three areas including the first area and the second area.

In this case, the gate pulse is not supplied to an area where the uplink signal is supplied.

For example, according to a light emitting display apparatus according to an embodiment of the present disclosure, a gate pulse is not supplied in an area where an uplink signal is supplied. Accordingly, noise is not included in the gate pulse, and thus an image can be normally output in an area where the gate pulse is supplied, and accordingly, the quality of a light emitting display apparatus can be improved.

Moreover, the touch driver 800 can supply the uplink signal to at least one of the touch driving electrodes TX during the blank period BP.

As described above, the uplink signal Uplink can include, information, for example, on a start timing for sensing a pen touch (hereinafter, simply referred to as pen touch start timing information).

Accordingly, a pen receiving the uplink signal from the touch electrode unit 100*b* can output a downlink signal based on a synchronization signal included in the pen touch start timing information.

The downlink signal output from the pen can be transmitted to the touch driver 800 through at least one of the touch driving electrodes TX provided in the touch electrode unit 100*b*.

Also, when the touch electrode unit 100*b* is further provided with touch receiving electrodes RX, the downlink signal output from the pen can be transmitted to the touch driver 800 through at least one of the touch receiving electrodes RX.

For example, when the pen is in contact with the touch electrode unit 100*b*, after the uplink signal is transmitted to the touch driving electrode TX, pen touch sensing signals can be transmitted from at least one of the touch driving electrodes TX and at least one of the touch receiving electrodes RX to the touch driver 800.

The pen touch sensing signals can be used to detect the position of the pen.

In addition, pen touch sensing signals can be supplied through the touch driving electrode TX and the touch receiving electrode RX provided in the area where the pen is in contact. In this case, the Y-axis coordinate of the light emitting display panel 100 can be determined by the touch driving electrode TX through which the pen touch sensing signal is transmitted, and the X-axis coordinate of the light emitting display panel 100 can be determined by the touch receiving electrode RX through which the pen touch sensing signal is transmitted. Accordingly, the coordinate of the position where the pen touch occurs can be determined.

Also, as illustrated in FIG. 10, when only touch driving electrodes TX are provided in the touch electrode unit 100*b*, the downlink signal output from the pen can be transmitted to the touch driver 800 through at least one of the touch driving electrodes TX provided in the touch electrode unit 100*b*.

In this case, each of the touch driving electrodes TX is provided at a specific coordinate. Accordingly, the coordinate of the position where the pen touch occurs can be determined by the touch driving electrode TX through which the pen touch sensing signal is transmitted.

Figure 12:
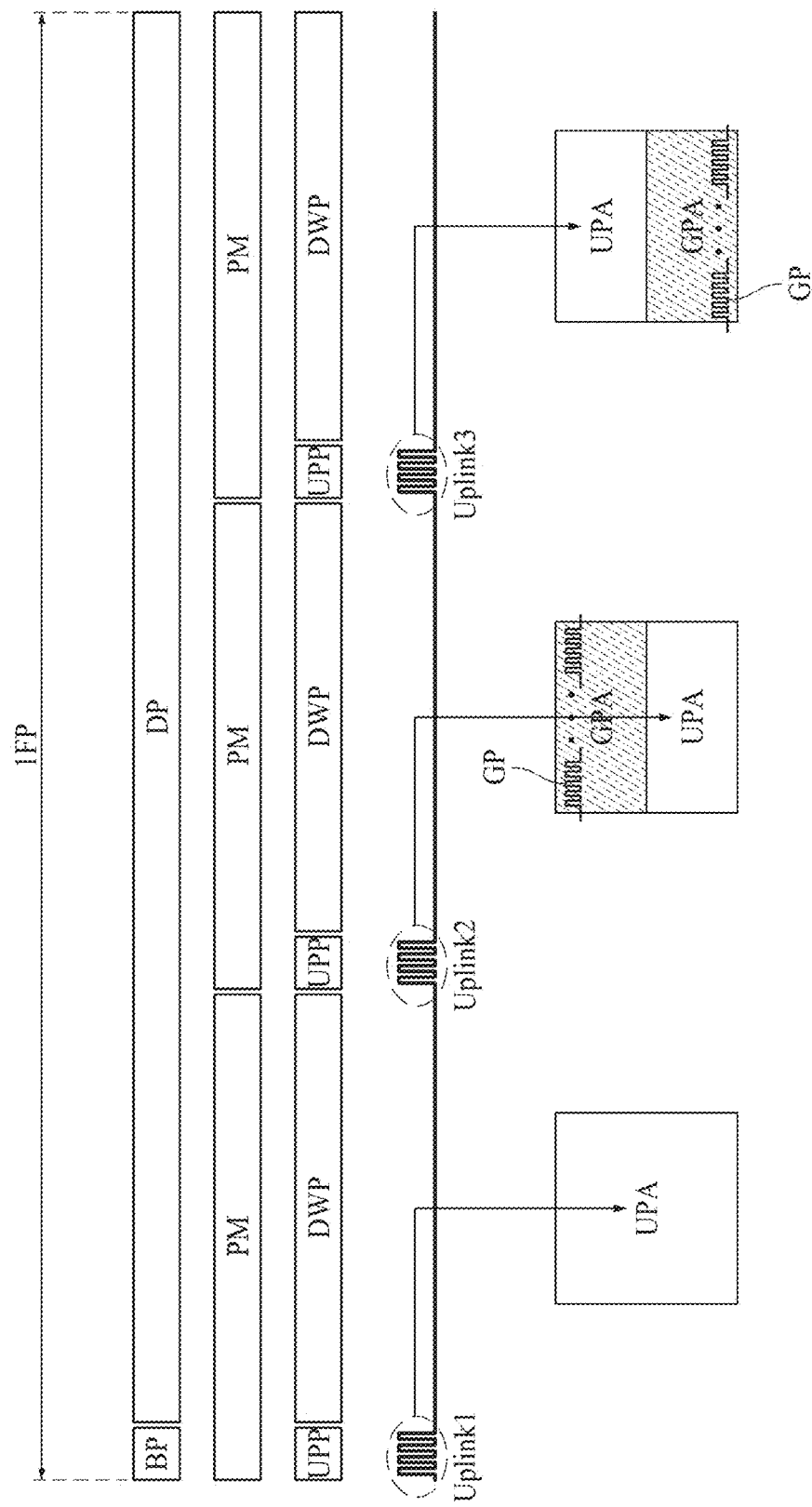
FIG. 12 is an exemplary diagram for explaining a detailed operation method of a light emitting display apparatus according to an embodiment of the present disclosure.

FIG. 12 is an exemplary diagram for explaining a detailed operation method of a light emitting display apparatus according to an embodiment of the present disclosure. In the following descriptions, details which are the same as or similar to details described with reference to FIGS. 1 to 11 are omitted or will be simply described.

As described above, the touch driver 800 can supply an uplink signal to touch driving electrode TX provided in the first area 1st AR or the second area 2nd AR during the display period DP in which an image is output from the light emitting device unit 100*a* in the one-frame period 1FP.

In the following description, a period in which the uplink signal Uplink is supplied to the touch electrode unit 100*b* is referred to as an uplink period UPP, and a period in which the downlink signal is supplied from the pen is referred to as a downlink period DWP.

For example, when the one-frame period 1FP starts from the blank period BP and the pen touch sensing mode PM for sensing a pen touch starts from the blank period BP, the touch driver 800 can supply the first uplink signal Uplink1 to at least one of the touch driving electrode TX during the blank period BP.

Because the gate pulse GP is not supplied during the blank period BP, the entire display area of the light emitting display panel 100 can become the uplink signal area UPA.

Accordingly, during the blank period BP, the touch driver 800 can supply a first uplink signal Uplink1 to at least one of the touch driving electrodes TX.

After the first uplink signal Uplink1 is supplied, the touch driver 800 waits until the preset period to receive the downlink signal. The waiting period for receiving the downlink signal means a downlink period DWP.

The touch driver 800 can determine that there is a pen touch through the downlink signal, and the touch driver 800 can determine a coordinate at which the pen touch is generated using the downlink signal. However, the coordinate at which the pen touch is generated can be determined by the control driver 400 which receives a digital value corresponding to the downlink signal from the touch driver 800.

In this case, the downlink period DWP for the first uplink signal Uplink1 can be included only in the blank period BP, but can also be included in the display period DP which is continuous after the blank period BP, as illustrated in FIG. 12.

When a pen touch is not sensed based on the first uplink signal Uplink1, the touch driver 800 can supply a second uplink signal Uplink2 to the second area touch driving electrode 2AR_TX provided in the second area 2nd AR while the gate pulses GP are supplied to the first area 1st AR.

Accordingly, the first area 1st AR can be the gate pulse area GPA, and the second area 2nd AR can be the uplink signal area UPA.

The touch driver 800 waits to receive the downlink signal during a downlink period DWP which is continuous after the second uplink signal Uplink2 is supplied.

When the pen touch is not sensed based on the second uplink signal Uplink2, the touch driver 800 can supply a third uplink signal Uplink3 to the first area touch driving electrode 2AR_TX provided in the first area 1st AR while the gate pulses GP are supplied to the second area 2nd AR. The touch driver 800 waits to receive the downlink signal during a downlink period DWP which is continuous after the third uplink signal Uplink3 is supplied.

Accordingly, the first area 1st AR can be the uplink signal area UPA, and the second area 2nd AR can be the gate pulse area GPA.

The above-described processes can be continued until a pen touch is sensed.

However, the above-described processes can be continued even when a pen touch is sensed.

For example, when a pen touch is sensed based on the first uplink signal Uplink1, the touch driver 800 can supply the second uplink signal Uplink2 to the second area touch driving electrode 2AR_TX provided in the second area 2nd AR while the gate pulses GP are supplied to the first area 2nd AR, and can supply the third uplink signal Uplink3 to the first area touch driving electrode 1AR_TX provided in the first area 1st AR while the gate pulses GP are supplied to the second area 2nd AR.

Moreover, when a pen touch is sensed based on the second uplink signal Uplink2, the touch driver 800 can supply the third uplink signal Uplink3 to the first area touch driving electrode 1AR_TX provided in the first area 1st AR while the gate pulses GP are supplied to the second area 2nd AR, and can supply the first uplink signal Uplink1 to at least one of the touch driving electrodes TX during the blank period BP which occurs after the third uplink signal Uplink3.

To provide an additional description, when a pen touch is not sensed, the touch driver 800 can supply the uplink signal to the second area touch driving electrode 2AR_TX provided in the second area 2nd AR while the gate pulses GP are supplied to the first area 1st AR, and can supply the uplink signal to the first area touch driving electrode 1AR_TX provided in the first area 1st AR while the gate pulses GP are supplied to the second area 2nd AR in the display period DP.

Also, even if a pen touch is sensed by the above-described processes, the touch driver 800 can supply an uplink signal to the second area touch driving electrode 2AR_TX provided in the second area 2nd AR while the gate pulses GP are supplied to the first area 1st AR, and can supply an uplink signal to the first area touch driving electrode 1AR_TX provided in the first area 1st AR while the gate pulses GP are supplied to the second area 2nd AR in the display period DP.

Accordingly, the gate pulse GP and the uplink signal Uplink are not simultaneously supplied to the first area 1st AR and the gate pulse GP and the uplink signal Uplink are not simultaneously supplied to the second area 2nd AR. Accordingly, the gate pulse GP is not affected by the uplink signal, and accordingly, the image can be displayed normally.

Figure 13A:
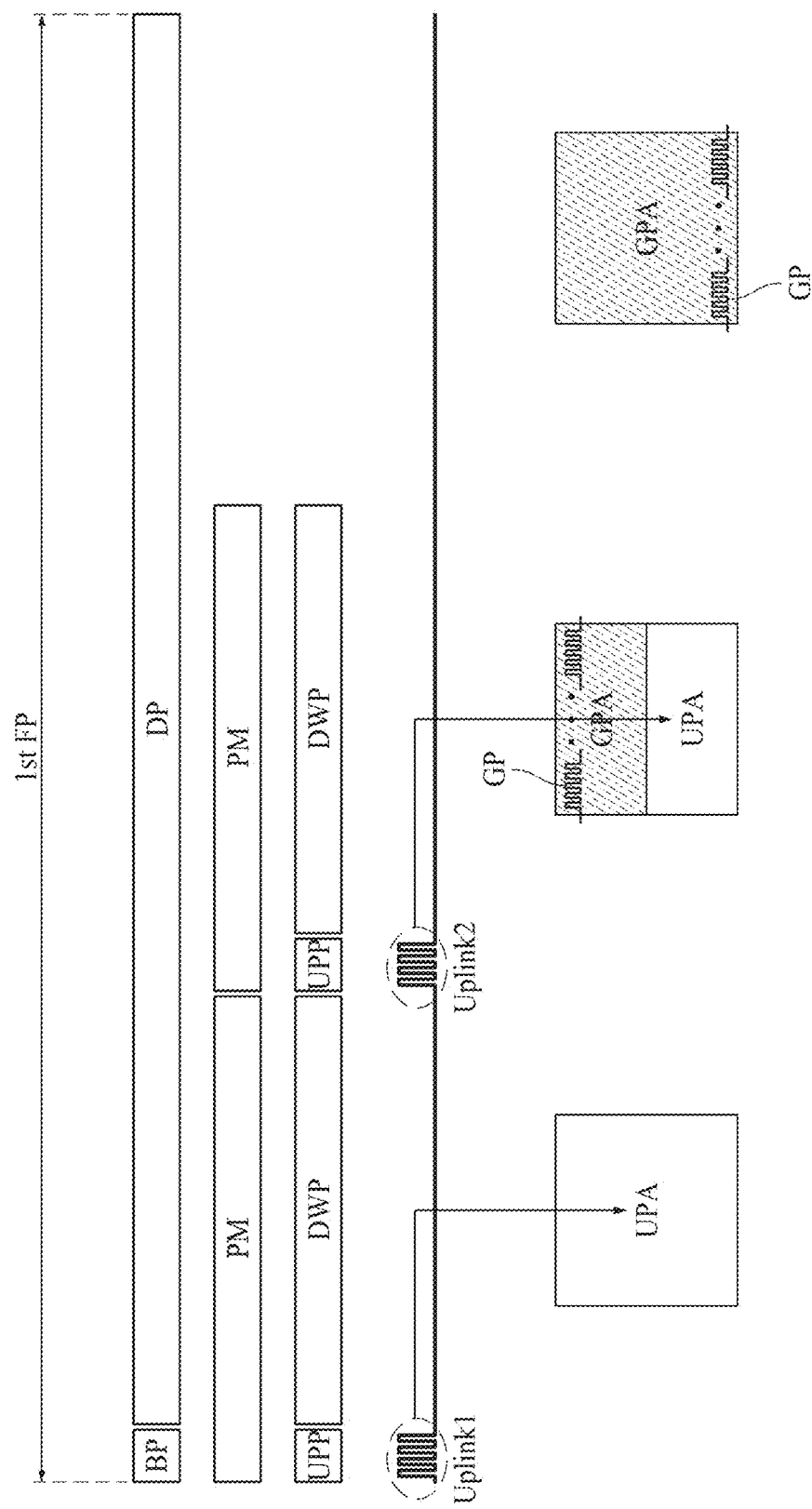
FIGS. 13A and 13B are other exemplary diagrams for explaining a detailed operation method of a light emitting display apparatus according to an embodiment of the present disclosure.
Figure 13B:
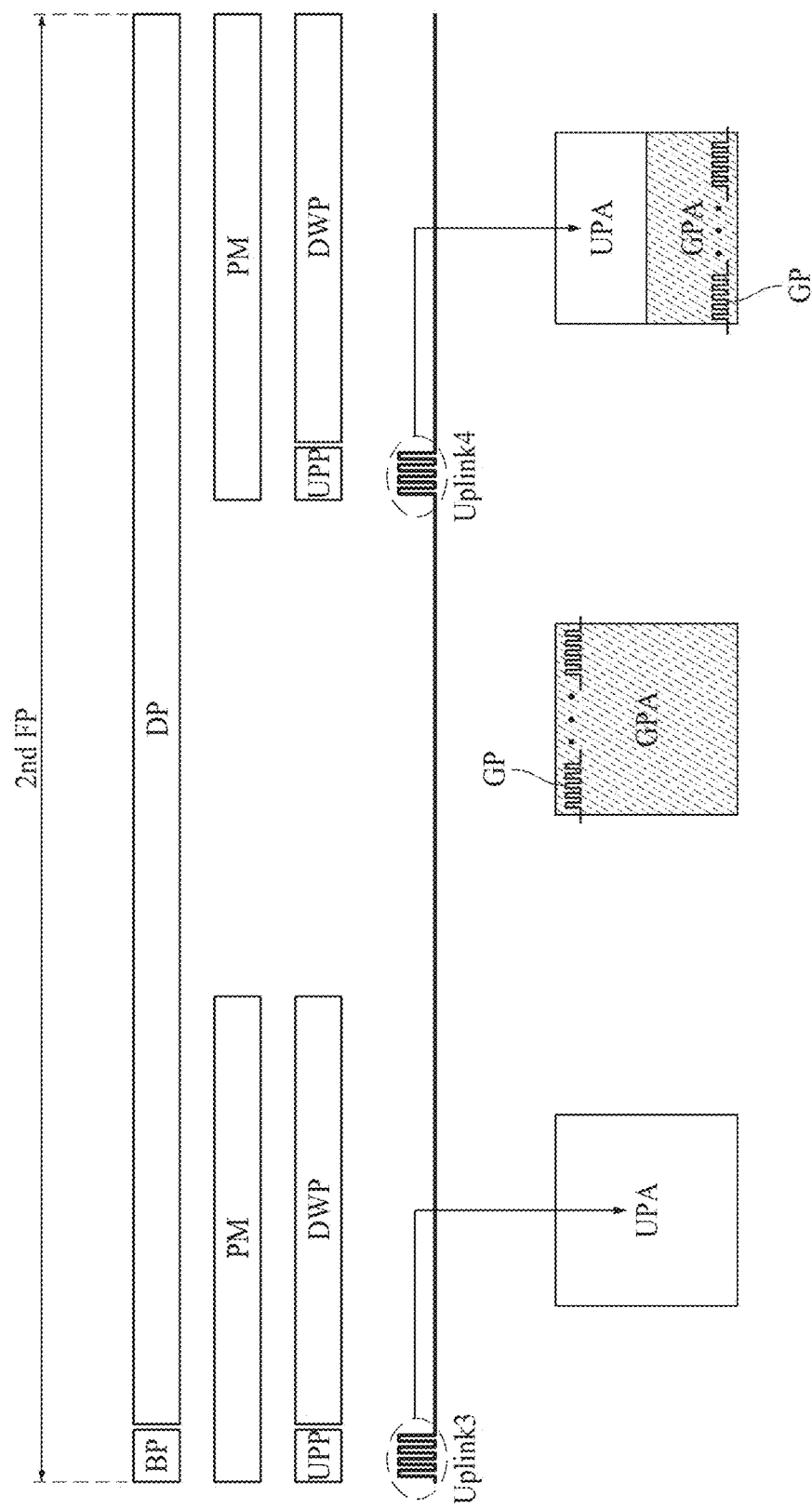

FIGS. 13A and 13B are other exemplary diagrams for explaining a detailed operation method of a light emitting display apparatus according to an embodiment of the present disclosure. In the following descriptions, details which are the same as or similar to details described with reference to FIGS. 1 to 12 are omitted or will be simply described.

As described above, the touch driver 800 can supply an uplink signal to the touch driving electrode TX provided in the first area 1st AR or the second area 2nd AR during the display period DP in which an image is output from the light emitting device unit 100*a* in the one-frame period 1FP.

For example, as illustrated in FIG. 13A, because the gate pulse GP is not supplied during the blank period BP of a first frame period 1st FP, the entire display area of the light emitting display panel 100 can be the uplink signal area UPA.

Accordingly, during the blank period BP, the touch driver 800 can supply the first uplink signal Uplink1 to at least one of the touch driving electrodes TX.

After the first uplink signal Uplink1 is supplied, the touch driver 800 waits until the preset period to receive the downlink signal. The waiting period for receiving the downlink signal means a downlink period DWP.

In this case, the downlink period DWP for the first uplink signal Uplink1 can be included only in the blank period BP, but can also be included in the display period DP which is continuous after the blank period BP, as illustrated in FIG. 13A.

When a pen touch is not sensed based on the first uplink signal Uplink1, the touch driver 800 can supply a second uplink signal Uplink2 to the second area touch driving electrode 2AR_TX provided in the second area 2nd AR while the gate pulses GP are supplied to the first area 1st AR.

Accordingly, the first area 1st AR can be the gate pulse area GPA, and the second area 2nd AR can be the uplink signal area UPA.

The touch driver 800 waits to receive the downlink signal during a downlink period DWP which is continuous after the second uplink signal Uplink2 is supplied. When a pen touch is not sensed based on the second uplink signal Uplink2, the touch driver 800 may not supply an uplink signal Uplink to the touch electrode unit 100b while the gate pulses GP are supplied to the second area 2nd AR.

Accordingly, the entire display area of the light emitting display 100 can be the gate pulse area GPA.

To provide an additional description, as described above, when the second uplink signal Uplink2 is supplied, the first area 1st AR becomes the gate pulse area GPA, and the second area 2nd AR becomes the uplink signal area UPA.

After the second uplink signal Uplink2 is supplied, the uplink signal is not supplied to the first area 1st AR and the second area 2nd AR during the remaining period of the first frame period 1st FP. Accordingly, a gate pulse can be supplied to the first area 1st AR and the second area 2nd AR.

For example, even after the second uplink signal Uplink2 is supplied, the gate pulse can be supplied to the first area 1st AR, and after the gate pulse is supplied to the first area 1st AR, the gate pulse can be supplied to the second area 2nd AR. Accordingly, the entire display area of the light emitting display panel 100 can be the gate pulse area GPA.

After this, when the display period DP ends, the first frame period 1st FP ends, and as illustrated in FIG. 13B, the second frame period 2nd FP starts.

For example, as illustrated in FIG. 13B, because the gate pulse GP is not supplied during the blank period BP of the second frame period 2nd FP, the entire display area of the light emitting display panel 100 can be the uplink signal area UPA.

Accordingly, the touch driver 800 can supply a third uplink signal Uplink3 to at least one of the touch driving electrodes TX during the blank period BP of the second frame period 2nd FP.

When a pen touch is not sensed based on the third uplink signal Uplink3, the touch driver 800 may not supply the uplink signal to the second area touch driving electrode 2AR_TX provided in the second area 2nd AR while the gate pulses GP are supplied to the first area 1st AR.

In this case, the gate pulse can be supplied to the first area 1st AR and the second area 2nd AR until a fourth uplink signal Uplink4 is supplied to the first area 1st AR.

Therefore, the entire display area of the light emitting display panel 100 can be the gate pulse area GPA.

Subsequently, while the gate pulses GP are supplied to the second area 2nd AR, the touch driver 800 can supply the fourth uplink signal Uplink4 to the first area touch driving electrode 1AR_TX provided in the first area 1st AR. The touch driver 800 waits to receive the downlink signal during a downlink period DWP which is continuous after the fourth uplink signal Uplink4 is supplied.

Accordingly, the first area 1st AR can be the uplink signal area UPA, and the second area 2nd AR can be the gate pulse area GPA.

The above-described processes can be continued until a pen touch is sensed.

However, the above-described processes can be continued even when a pen touch is sensed.

For example, when a pen touch is sensed by the first uplink signal Uplink1 supplied during the blank period BP of the first frame period 1st FP, the touch driver 800 can supply the second uplink signal Uplink2 to the second area touch drive electrode 2AR_TX provided in the second area 2nd AR while the gate pulses GP are supplied to the first area 1st AR, and may not supply the uplink signal Uplink while the gate pulses GP are supplied to the second area 2nd AR.

Sequentially, when the blank period BP of the second frame period 2nd FP starts, the touch driver 800 can supply the third uplink signal to the touch driving electrodes TX provided in the first area 1st AR and the second area 2nd AR.

Moreover, while the gate pulses GP are supplied to the first area 1st AR in the second frame period 2nd FP, the touch driver 800 may not supply the uplink signal to the second area touch driving electrode 2AR_TX provided in the second area 2nd AR, and while the gate pulses GP are supplied to the second area 2nd AR in the second frame period 2nd FP, the touch driver 800 can supply the fourth uplink signal Uplink4 to the first area touch driving electrode 1AR_TX provided in the first area 1st AR.

As another example, when a pen touch is sensed based on the second uplink signal Uplink2 supplied during the first frame period 1st FP, the touch driver 800 may not supply the uplink signal to the first area touch driving electrode 1AR_TX provided in the first area 1st AR while the gate pulses GP are supplied to the second area 2nd AR in the first frame period 1st FP.

During the blank period BP of the second frame period 2nd FP which occurs after the first frame period 1st FP as shown in FIG. 13B, the touch driver 800 can supply the third uplink signal Uplink3 to at least one of the touch driving electrodes TX provided in the first area 1st AR and the second area 2nd AR.

Also, while the gate pulses GP are supplied to the first area 1st AR in the second frame period 2nd FP, the touch driver 800 may not supply the uplink signal to the second area touch driving electrode 2AR_TX provided in the second area 2nd AR, and while the gate pulses GP are supplied to the second area 2nd AR in the second frame period 2nd FP, the touch driver 800 can supply the fourth uplink signal Uplink4 to the first area touch driving electrode 1AR_TX provided in the first area 1st AR.

To provide an additional description, if a pen touch is not sensed in the pen touch sensing mode PM for sensing the pen touch, the touch driver 800 can supply the uplink signal to the second area touch driving electrode 2AR_TX provided in the second area 2nd AR while the gate pulses GP are supplied to the first area 1st AR in the first frame period 1st FP, may not supply the uplink signal to the touch driving electrodes TX provided in the first area 1st AR and the second area 2nd AR while the gate pulses GP are supplied to the second area 2nd AR in the first frame period 1st FP, may not supply the uplink signal to the touch driving electrodes TX provided in the first area 1st AR and the second area 2nd AR while the gate pulses GP are supplied to the first area 1st AR in the second frame period 2nd FP, and can supply the uplink signal to the first area touch driving electrode 1AR_TX provided in the first area 1st AR while the gate pulses GP are supplied to the second area 2nd AR in the second frame period 2nd FP.

Also, even if a pen touch is sensed by the above-described processes, the touch driver 800 can supply the uplink signal to the second area touch driving electrode 2AR_TX provided in the second area 2nd AR while the gate pulses GP are supplied to the first area 1st AR in the first frame period 1st FP, and can supply the uplink signal to the first area touch driving electrode 1AR_TX provided in the first area 1st AR while the gate pulses GP are supplied to the second area 2nd AR in the second frame period 2nd FP.

Accordingly, the gate pulse GP and the uplink signal Uplink are not simultaneously supplied to the first area 1st AR, and are not simultaneously supplied to the second area 2nd AR. Accordingly, the gate pulse GP is not affected by the uplink signal, and accordingly, the image can be displayed normally.

In particular, while a pen touch is not sensed, the uplink signal can be supplied only to the first area 1st AR or the second area 2nd AR in the one-frame period 1FP.

Therefore, according to a light emitting display apparatus according to an embodiment of the present disclosure as described above, power consumption can be reduced.

Figure 14:
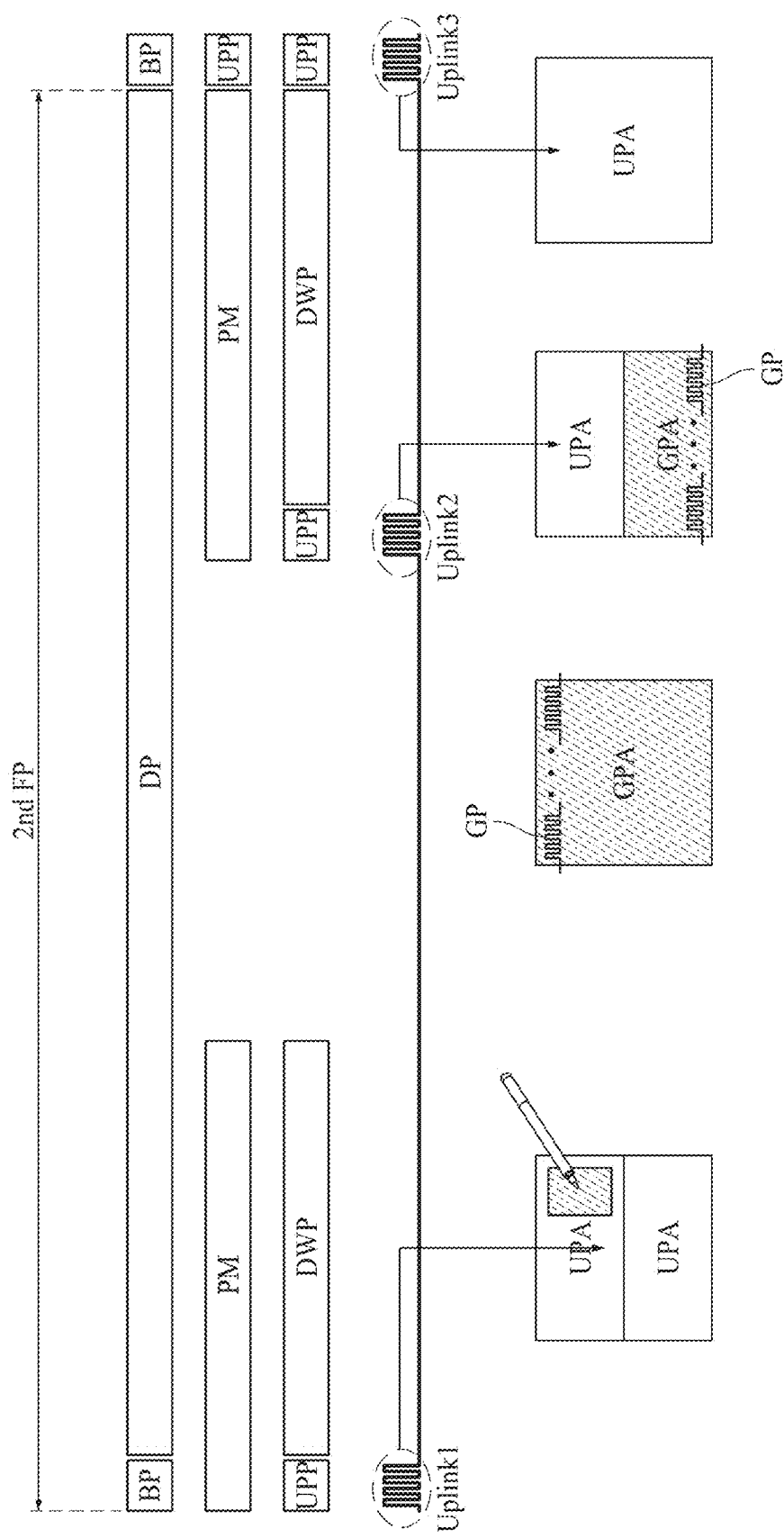
FIG. 14 is another exemplary diagram for explaining a detailed operation method of a light emitting display apparatus according to an embodiment of the present disclosure.

FIG. 14 is another exemplary diagram for explaining a detailed operation method of a light emitting display apparatus according to an embodiment of the present disclosure, and particularly, an exemplary diagram for explaining an operation method when a pen touch is sensed. In the following descriptions, details which are the same as or similar to details described with reference to FIGS. 1 to 13B are omitted or will be simply described.

As described above, the touch driver 800 can supply an uplink signal to the touch driving electrode TX provided in the first area 1st AR or the second area 2nd AR in the display period DP in which an image is output from the light emitting device unit 100a during a one-frame period 1FP.

When a pen touch is sensed in the first area 1st AR by the above-described operations, as illustrated in FIG. 14, in the display period DP, the touch driver 800 can supply an uplink signal to a part of the touch electrode unit by avoiding the area and time in which the gate pulse is supplied. For example, during the display period DP, the uplink signal can be supplied only to the first area 1st AR.

For example, when a pen touch is sensed in the first area 1st AR based on an uplink signal supplied in the first frame period 1st FP, or when a pen touch is sensed, as illustrated in FIG. 14, in the first area 1st AR based on the first uplink signal Uplink1 supplied in the blank period BP of the second frame period 2nd FP, the touch driver 800 may not supply the uplink signal to the first area 1st AR and the second area 2nd AR while the gate pulses GP are supplied to the first area 1st AR in the second frame period 2nd FP, and can supply the second uplink signal Uplink2 to the first area 1st AR while the gate pulses GP are supplied to the second area 2nd AR in the second frame period 2nd FP.

For example, when a pen touch is sensed in the first area 1st AR, the touch driver 800 can supply an uplink signal only to the first area 1st AR during the display period DP, and in particular, can supply an uplink signal to the first area 1st AR while the gate pulses GP are not supplied to the first area 1st AR.

Accordingly, the gate pulse GP and the uplink signal Uplink are not simultaneously supplied to the first area 1st AR and are not simultaneously supplied to the second area 2nd AR. Accordingly, the gate pulse GP is not affected by the uplink signal, and accordingly, the image can be displayed normally.

Particularly, when a pen touch is sensed, an uplink signal can be supplied only to the first area 1st AR in which the pen touch is sensed or the second area 2nd AR in which the pen touch is sensed in a one-frame period 1FP.

Therefore, according to a light emitting display apparatus according to an embodiment of the present disclosure as described above, power consumption can be reduced.

Figure 15:
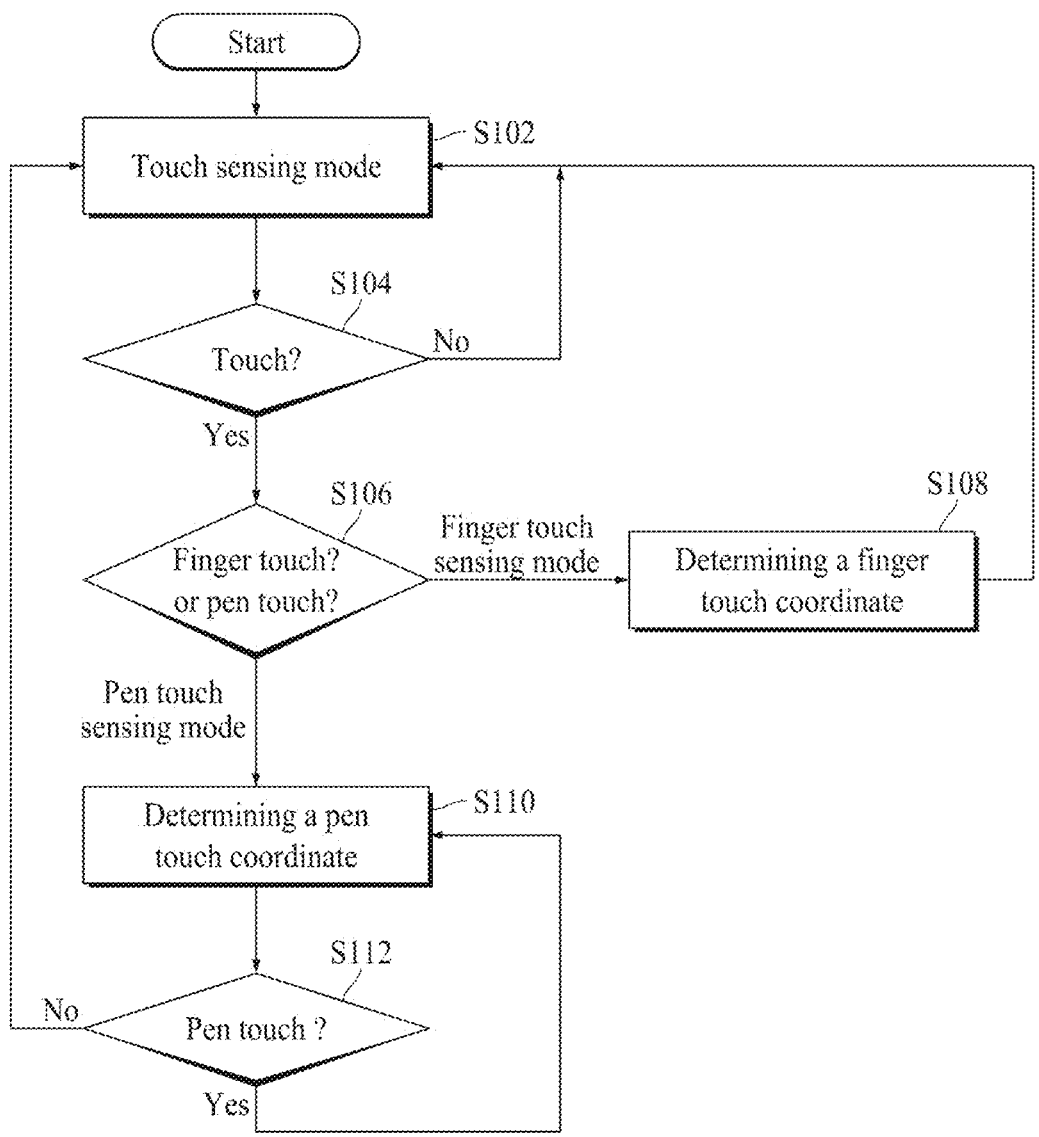
FIG. 15 is an exemplary flowchart illustrating an operation method of a light emitting display apparatus according to an embodiment of the present disclosure.
Figure 16:
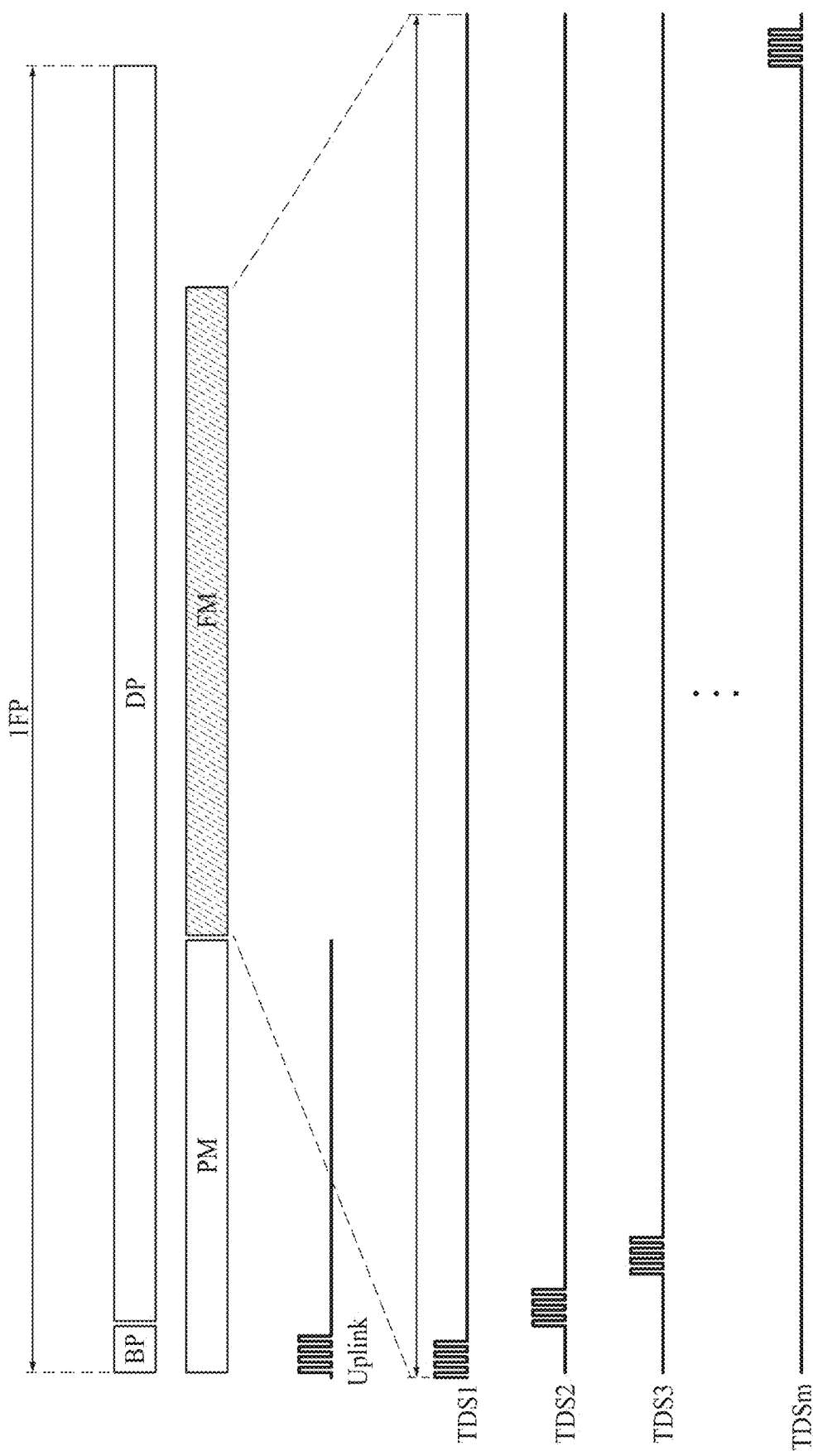
FIGS. 16 and 17 are other exemplary diagrams for explaining a detailed operation method of a light emitting display apparatus according to an embodiment of the present disclosure.
Figure 17:
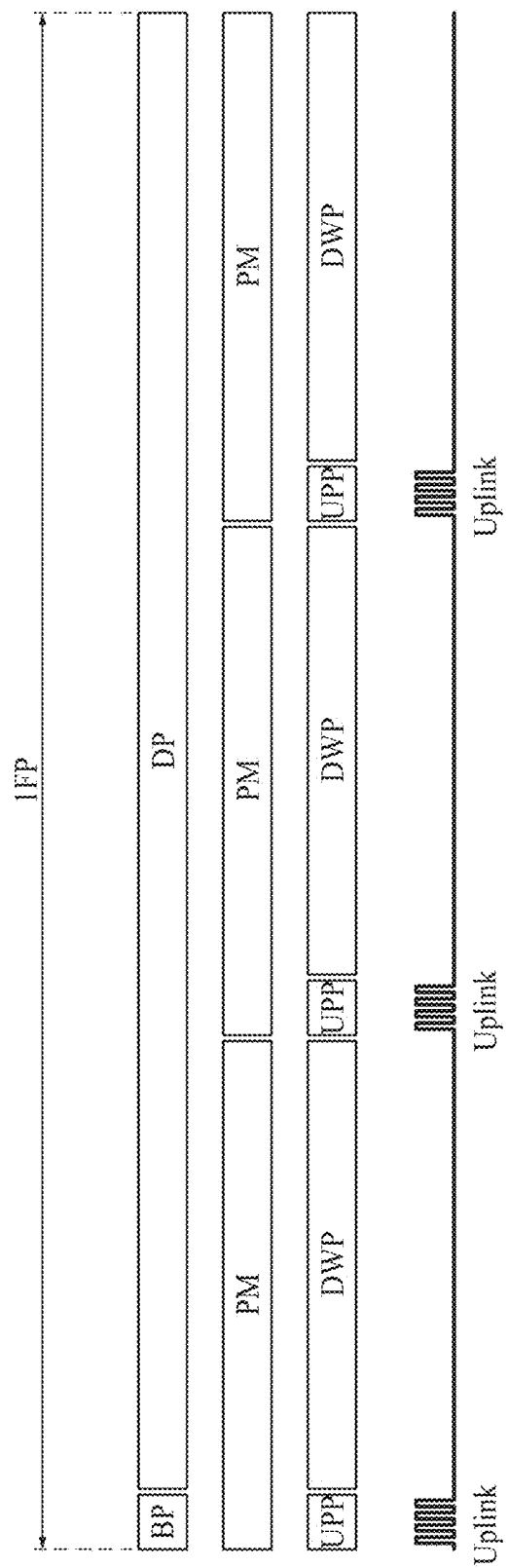

FIG. 15 is an exemplary flowchart illustrating an operation method of a light emitting display apparatus according to an embodiment of the present disclosure, and FIGS. 16 and 17 are other exemplary diagrams for explaining a detailed operation method of a light emitting display apparatus according to an embodiment of the present disclosure. In the following descriptions, details which are the same as or similar to details described with reference to FIGS. 1 to 14 are omitted or will be briefly described.

In the above description, referring to FIGS. 1 to 14, a light emitting display apparatus in which only a pen touch is sensed during the display period DP has been mainly described.

However, as described with reference to FIG. 6A, a light emitting display apparatus 10 according to an embodiment of the present disclosure can further sense a touch (hereinafter, simply referred to as a finger touch) by the user's finger, and for this purpose, the user's finger can be in contact with the light emitting display apparatus 10 according to an embodiment of the present disclosure.

To this end, the touch driver 800 applied to a light emitting display apparatus according to an embodiment of the present disclosure can further include the touch driving signal generation unit 850 which generates touch driving signals TDS1 to TDSm (m is a natural number) to be transmitted to the touch driving electrodes TX in the finger touch sensing mode FM for sensing a finger touch, as described above with reference to FIG. 9.

The number of touch driving signals TDS1 to TDSm can correspond to the number of touch driving electrodes TX described above with reference to FIGS. 7A and 7B.

However, because the area of the finger is larger than the area of the pen, at least two of the touch driving electrodes TX described with reference to FIGS. 7A and 7B can be connected to form one touch driving electrode TX. In this case, at least two of the touch receiving electrodes RX described with reference to FIGS. 7A and 7B can be connected to form one touch receiving electrode RX.

Therefore, the number of touch driving signals TDS1 to TDSm can be smaller than the number of touch driving electrodes TX described with reference to FIGS. 7A and 7B.

Hereinafter, for convenience of description, a method of operating a light emitting display apparatus according to an embodiment of the present disclosure will be described using an example in which the number of touch driving electrodes TX used to sense a pen touch is the same as the number of touch driving electrodes TX used to sense a finger touch. In this case, m can be the same as the number of touch driving electrodes TX.

First, if the touch sensing mode is started (S102), the touch driver 800 can transmit an uplink signal to the touch electrode unit 100b during the blank period BP, as illustrated in FIG. 16. That is, when the one-frame period 1FP starts, the pen touch sensing mode PM can start.

As described above, because the gate pulses GP are not supplied to the gate lines GL1 to GLg during the blank period BP, the touch driver 800 can supply an uplink signal to the touch driving electrodes TX provided in the first area 1st AR and the second area 2nd AR during the blank period BP.

After supplying the uplink signal to the touch driving electrodes TX during the blank period BP, the touch driver 800 waits to receive the pen touch sensing signals.

As described above, the downlink period DWP waiting to receive the downlink signals can be extended to the display period DP which is continuous after the blank period BP.

If the pen touch sensing signal is not received during the downlink period DWP (S104), the touch driver 800 starts the finger touch sensing mode FM. That is, if it is determined that there is no pen touch in the pen touch sensing mode PM, the touch driver 800 can proceed to the finger touch sensing mode FM. Also, if it is determined that there is no pen touch in the pen touch sensing mode PM by using the information received from the touch driver 800, the control driver 400 can transmit a control signal, which allows the touch driving signals TDS1 to TDSm to be sequentially supplied to the touch driving electrodes TX, to the touch driver 800.

In the finger touch sensing mode FM, the touch driver 800 can sequentially supply the touch driving signals TDS1 to TDSm to the touch driving electrodes TX, as illustrated in FIG. 16. Accordingly, the finger touch sensing mode FM can proceed.

The touch driver 800 can determine whether a finger touch occurs by using finger touch sensing signals generated by the touch driving signals TDS1 to TDSm.

When the finger touch does not occur and another one-frame period 1FP starts, the touch driver 800 repeats the pen touch sensing mode PM and the finger touch sensing mode FM as described above.

For example, when the pen touch sensing mode PM starts, the touch driver 800 transmits the uplink signal to the touch driving electrodes TX to determine whether a pen is touched. When it is determined that there is no pen touch, the touch driver 800 sequentially transmits the touch driving signals TDS1 to TDSm to the touch driving electrodes TX to proceed with the finger touch sensing mode FM. When it is determined that there is no finger touch in the finger touch sensing mode FM, the touch driver 800 can proceed with the pen touch sensing mode PM again. Accordingly, the pen touch sensing mode PM and the finger touch sensing mode FM can be continuously repeated.

Next, while the pen touch sensing mode PM and the finger touch sensing mode FM are repeated, if the pen touch is not sensed and the finger touch is sensed (S106), the touch driver 800 or the control driver 400 can determine a coordinate of the position where the finger touch occurs by using the received finger touch sensing signals (S108).

To provide an additional description, if the pen touch is not detected in the pen touch sensing mode PM which senses the pen touch (S102, S104, S106), the touch driver 800 may not transmit the uplink signal to the touch electrode unit 100b during the display period DP.

In this case, in the finger touch sensing mode FM for sensing a finger touch, the touch driver 800 can sequentially transmit the touch driving signals TDS1 to TDSm to the touch driving electrodes TX, and can receive finger touch sensing signals generated by touch driving signals from the touch receiving electrodes RX included in the touch electrode unit 100b.

The touch driver 800 or the control driver 400 can determine the coordinates of the position where the finger touch occurs by using the received finger touch sensing signals (S108).

Next, while the pen touch sensing mode PM and the finger touch sensing mode FM are repeated (S102 to S108), when a pen touch is sensed (S106), the touch driver 800, as illustrated in FIG. 17, can sense a pen touch by supplying the uplink signal to touch driving electrode TX provided in the first area 1st AR or the second area 2nd AR during the display period DP.

That is, the touch driver 800 or the control driver 400 can determine the coordinates of the position where the pen touch occurs by using the received pen touch sensing signals (S110).

In this case, as described above, the touch driver 800 can supply the uplink signal to the second area 2nd AR while the gate pulses GP are supplied to the first area 1st AR, and can supply the uplink signal to the first area 1st AR while the gate pulses GP are supplied to the second area 2nd AR.

In particular, the touch driver 800 can supply the uplink signal to the first area 1st AR or the second area 2nd AR using any one of various methods described with reference to FIGS. 12, 13A, 13B, and 14.

To provide an additional description, when a pen touch is detected in the pen touch sensing mode PM, the touch driver 800 can supply the uplink signal to the touch driving electrode TX provided in the first area 1st AR or the second area 2nd AR without supplying the touch driving signals TDS1 to TDSm to the touch driving electrodes TX during the display period DP.

Also, the touch driver 800 can supply the uplink signal to the touch driving electrode TX provided in the first area 1st AR and the touch driving electrode TX provided in the second area 2nd AR during the blank period between the display period and another display period.

Finally, after the pen touch is sensed, when the pen touch is continuously sensed (S112), the touch driver 800 can repeatedly perform the process (S110) of determining the coordinates of the position where the pen touch occurs.

If the pen touch is no longer sensed after the pen touch is sensed (S112), the touch driver 800 can again perform the process (S102) of repeatedly sensing the pen touch and the finger touch (touch sensing mode).

According to a light emitting display apparatus according to an embodiment of the present disclosure as described above, the gate pulse GP and the uplink signal Uplink are not simultaneously supplied to the first area 1st AR and are not simultaneously supplied to the second area 2nd AR. Accordingly, the gate pulse GP is not affected by the uplink signal, and accordingly, the image can be normally displayed from the light emitting display panel 100.

The features of the light emitting display apparatus according to an embodiment of the present disclosure are briefly summarized as follows.

A light emitting display apparatus according to an embodiment of the present disclosure includes a light emitting device unit with light emitting devices and gate lines, a touch electrode unit including touch electrodes provided on the light emitting device unit, and a touch driver sensing a pen touch by driving the touch electrode unit, wherein the touch electrode unit includes a first area and a second area, each of the first area and the second area is provided in parallel with the gate lines, and in a one-frame period, the touch driver supplies an uplink signal to a touch driving electrode provided in the first area or the second area during a display period in which an image is output from the light emitting device unit.

A gate pulse is not supplied to an area corresponding to an area to which the uplink signal is supplied, in the light emitting device unit.

In a blank period between the display period and another display period, the touch driver supplies uplink signals to touch driving electrodes provided in the first area and touch driving electrodes provided in the second area.

If a pen touch is not sensed in a pen touch sensing mode for sensing a pen touch, the touch driver supplies an uplink signal to the second area while gate pulses are supplied to the first area, and supplies an uplink signal to the first area while gate pulses are supplied to the second area.

If a pen touch is not sensed in a pen touch sensing mode for sensing a pen touch, the touch driver supplies an uplink signal to the second area while gate pulses are supplied to the first area in a first frame period, the touch driver supplies an uplink signals to the first area while gate pulses are supplied to the second area in a second frame period extending from the first frame period, and an uplink signal is not supplied to the first area in the first frame period and an uplink signal is not supplied to the second area in the second frame period.

If a pen touch is sensed in the first area in a pen touch sensing mode for sensing a pen touch, the touch driver supplies an uplink signal only to the first area in the display period.

The touch driver supplies the uplink signal to the first area when gate pulses are not supplied to the first area.

If a pen touch is not sensed in a pen touch sensing mode for sensing a pen touch, the touch driver does not transmit the uplink signal to the touch electrode unit in the display period, the touch driver sequentially supplies touch driving signals to the touch driving electrodes disposed in the first area and the second area in the display period of a finger touch sensing mode for sensing a finger touch, and the touch driver receives finger touch sensing signals generated by the touch driving signals from touch receiving electrodes included in the touch electrode unit.

If a pen touch is sensed in the pen touch sensing mode, the touch driver does not supply touch driving signals to the touch driving electrodes in the display period, the touch driver supplies an uplink signal to a touch driving electrode provided in the first area or the second area in the display period, and in a blank period between the display period and another display period, the touch driver supplies uplink signals to touch driving electrodes provided in the first area and touch driving electrodes provided in the second area.

If a touch pen contacts the touch electrode unit, after the uplink signal is transmitted to the touch driving electrode, pen touch sensing signals are transmitted from the touch driving electrodes and touch receiving electrodes included in the touch electrode unit to the touch driver, and the pen touch sensing signals are used to detect the position of the touch pen.

The touch driving electrodes are provided on the light emitting device unit along a first direction parallel to the gate lines.

The touch electrode unit includes touch driving electrodes provided on the light emitting device unit along a first direction parallel to the gate lines and touch receiving electrodes provided on the light emitting device unit along a second direction different from the first direction, and the touch driver supplies the uplink signal to at least one of touch driving electrode provided in the first area or the second area.

The touch electrode unit includes the touch driving electrodes, the touch driving electrodes include first area touch driving electrodes provided in the first area and second area touch driving electrodes provided in the second area, and the touch driver supplies an uplink signal to at least one of the first area touch driving electrodes or at least one of the second area touch driving electrodes in the display period.

The touch electrode unit includes touch receiving electrodes and the touch driving electrodes, the touch driving electrodes include first area touch driving electrodes provided in the first area and second area touch driving electrodes provided in the second area, the touch driver includes an uplink signal generation unit configured to generate the uplink signal in a pen touch sensing mode for sensing a pen touch, a switching unit configured to connect at least one of the first region touch driving electrodes to the uplink signal generation unit or connect at least one of the second region touch driving electrodes to the uplink signal generation unit, and a touch sensing unit configured to convert pen touch sensing signals received from the touch driving electrodes and the touch receiving electrodes into digital values.

The touch driver further includes a touch driving signal generation unit configured to generate touch driving signals to be transmitted to the touch driving electrodes in a finger touch sensing mode for sensing a finger touch, and in the finger touch sensing mode, the switching unit sequentially connects the touch driving electrodes to the touch driving signal generation unit.

In the finger touch sensing mode, the touch sensing unit converts finger touch sensing signals received by the touch driving signals from the touch receiving electrodes into digital values.

The light emitting display apparatus according to the present disclosure can be applied to all electronic devices including a light emitting display panel. For example, the light emitting display apparatus according to the present disclosure can be applied to a virtual reality VR device, an augmented reality AR device, a mobile device, a video phone, a smart watch, a watch phone, or a wearable device, foldable device, rollable device, bendable device, flexible device, curved device, electronic notebook, e-book, PMP portable multimedia player, PDA personal digital assistant, MP3 player, mobile medical device, desktop PC, laptop PC, netbook computer, workstation, navigation, car navigation, vehicle display devices, televisions, wall paper display devices, signage devices, game devices, laptops, monitors, cameras, camcorders, and home appliances.

According to a light emitting display apparatus according to an embodiment of the present disclosure, in a display period in which an image is output, an uplink signal supplied from a light emitting display apparatus to a touch pen is not supplied to an area where a gate pulse is supplied.

Accordingly, noise is not included in the gate pulse, and thus, in the area where the gate pulse is supplied, an image can be normally output. Accordingly, the quality of a light emitting display apparatus can be improved.

Also, according to a light emitting display apparatus according to an embodiment of the present disclosure, it can be determined whether a touch pen is touched once or more in a display period. Accordingly, whether a touch pen is touched can be quickly determined.

That is, according to a light emitting display apparatus according to an embodiment of the present disclosure, even if it is determined whether a touch pen is touched at least once in a display period, an image can be normally output in the display period, and accordingly, the quality of a light emitting display apparatus can be improved.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the present disclosure.

What is claimed is:

1. A light emitting display apparatus comprising:
a light emitting device unit including light emitting devices and gate lines;
a touch electrode unit including a plurality of touch electrodes on the light emitting device unit; and
a touch driver configured to sense a pen touch by driving the touch electrode unit,
wherein the touch electrode unit includes a first area and a second area,
each of the first area and the second area is parallel with the gate lines, and
in one-frame period, the touch driver supplies an uplink signal to a touch driving electrode provided in the first area or the second area during a display period of the one-frame period in which an image is output from the light emitting device unit, and
if the pen touch is not sensed in a pen touch sensing mode for sensing the pen touch, the touch driver supplies an uplink signal to the second area while gate pulses are supplied to the first area, and supplies an uplink signal to the first area while gate pulses are supplied to the second area.

2. The light emitting display apparatus of claim 1, wherein a gate pulse is not supplied to an area corresponding to an area to which the uplink signal is supplied in the light emitting device unit.

3. The light emitting display apparatus of claim 1, wherein in a blank period between the display period and another display period, the touch driver supplies uplink signals to touch driving electrodes from the plurality of touch electrodes in the first area and touch driving electrodes from the plurality of touch electrodes in the second area.

4. A light emitting display apparatus comprising:
a light emitting device unit including light emitting devices and gate lines;
a touch electrode unit including a plurality of touch electrodes on the light emitting device unit; and
a touch driver configured to sense a pen touch by driving the touch electrode unit,
wherein the touch electrode unit includes a first area and a second area,
each of the first area and the second area is parallel with the gate lines,
in one-frame period, the touch driver supplies an uplink signal to a touch driving electrode provided in the first area or the second area during a display period of the one-frame period in which an image is output from the light emitting device unit, and
if the pen touch is not sensed in a pen touch sensing mode for sensing the pen touch,
the touch driver supplies an uplink signal to the second area while gate pulses are supplied to the first area in a first frame period,
the touch driver supplies an uplink signal to the first area while gate pulses are supplied to the second area in a second frame period extending from the first frame period, and
an uplink signal is not supplied to the first area in the first frame period and an uplink signal is not supplied to the second area in the second frame period.

5. The light emitting display apparatus of claim 1, wherein if the pen touch is sensed in the first area in a pen touch sensing mode for sensing the pen touch, the touch driver supplies an uplink signal to the first area but not the second area in the display period.

6. The light emitting display apparatus of claim 5, wherein the touch driver supplies the uplink signal to the first area when gate pulses are not supplied to the first area.

7. A light emitting display apparatus comprising:
a light emitting device unit including light emitting devices and gate lines;
a touch electrode unit including a plurality of touch electrodes on the light emitting device unit; and
a touch driver configured to sense a pen touch by driving the touch electrode unit,
wherein the touch electrode unit includes a first area and a second area,
each of the first area and the second area is parallel with the gate lines,
in one-frame period, the touch driver supplies an uplink signal to a touch driving electrode provided in the first area or the second area during a display period of the one-frame period in which an image is output from the light emitting device unit, and
if the pen touch is not sensed in a pen touch sensing mode for sensing the pen touch,
the touch driver does not transmit the uplink signal to the touch electrode unit in the display period,
the touch driver sequentially supplies touch driving signals to touch driving electrodes from the plurality of touch electrodes disposed in the first area and the second area in the display period of a finger touch sensing mode for sensing a finger touch, and
the touch driver receives finger touch sensing signals generated by the touch driving signals from touch receiving electrodes from the plurality of touch electrodes included in the touch electrode unit.

8. The light emitting display apparatus of claim 7, wherein if the pen touch is sensed in the pen touch sensing mode,
the touch driver does not supply touch driving signals to the touch driving electrodes in the display period,
the touch driver supplies an uplink signal to a touch driving electrode from the plurality of touch electrodes provided in the first area or the second area in the display period, and
in a blank period between the display period and another display period, the touch driver supplies uplink signals to the touch driving electrodes provided in the first area and touch driving electrodes provided in the second area.

9. The light emitting display apparatus of claim 1, wherein if a touch pen contacts the touch electrode unit,
after the uplink signal is transmitted to the touch driving electrode, pen touch sensing signals are transmitted from touch driving electrodes and touch receiving electrodes from the plurality of touch electrodes included in the touch electrode unit to the touch driver, and
the pen touch sensing signals are used to detect a position of the touch pen.

10. The light emitting display apparatus of claim 1, wherein touch driving electrodes from the plurality of touch electrodes are on the light emitting device unit along a first direction parallel to the gate lines.

11. The light emitting display apparatus of claim 1, wherein the plurality of touch electrodes includes:

touch driving electrodes on the light emitting device unit along a first direction parallel to the gate lines; and touch receiving electrodes on the light emitting device unit along a second direction that is different from the first direction, wherein the touch driver supplies the uplink signal to at least one of touch driving electrode from the touch driving electrodes provided in the first area or the second area.

12. The light emitting display apparatus of claim 1, wherein the touch electrode unit includes touch driving electrodes, the touch driving electrodes include first area touch driving electrodes in the first area and second area touch driving electrodes in the second area, and the touch driver supplies an uplink signal to at least one of the first area touch driving electrodes or at least one of the second area touch driving electrodes in the display period.

13. The light emitting display apparatus of claim 1, wherein the touch electrode unit includes touch receiving electrodes and touch driving electrodes, the touch driving electrodes include first area touch driving electrodes in the first area and second area touch driving electrodes provided in the second area, the touch driver includes:

an uplink signal generation circuit configured to generate the uplink signal in a pen touch sensing mode for sensing a pen touch;

a switching circuit configured to connect at least one of the touch driving electrodes in the first area to the uplink signal generation unit or connect at least one of the touch driving electrodes in the second area to the uplink signal generation unit; and a touch sensing circuit configured to convert pen touch sensing signals received from the touch driving electrodes and the touch receiving electrodes into digital values.

14. The light emitting display apparatus of claim 13, wherein the touch driver further includes a touch driving signal generation circuit configured to generate touch driving signals that are transmitted to the touch driving electrodes in a finger touch sensing mode for sensing a finger touch, and in the finger touch sensing mode, the switching circuit sequentially connects the touch driving electrodes to the touch driving signal generation circuit.

15. The light emitting display apparatus of claim 14, wherein in the finger touch sensing mode, the touch sensing circuit converts finger touch sensing signals based on touch driving signals received from the touch receiving electrodes into digital values.

16. The light emitting display apparatus of claim 13, wherein when uplink signals are supplied to the touch driving electrodes, the touch driving electrodes are separated from the touch sensing unit, and wherein when pen touch sensing signals are transmitted from the touch driving electrodes to the touch sensing unit, the touch driving electrodes are connected to the touch sensing unit.

17. The light emitting display apparatus of claim 13, wherein touch driving electrode lines connected to the first area touch driving electrodes do not overlap gate lines provided in the second area, and touch driving electrode lines connected to the second area touch driving electrodes do not overlap gate lines provided in the first area.

18. The light emitting display apparatus of claim 1, wherein the touch driver supplies the uplink signal only to some of touch driving electrodes provided in the first area during the display period.

\* \* \* \* \*